US010157230B2

(12) United States Patent
Glover et al.

(10) Patent No.: US 10,157,230 B2
(45) Date of Patent: Dec. 18, 2018

(54) GENERATING SEARCH RESULTS BASED ON CLUSTERED APPLICATION STATES

(71) Applicant: Samsung Electronics Co., Ltd., Suwon-si, Gyeonggi-do (KR)

(72) Inventors: Eric Glover, Palo Alto, CA (US); Leigh L. Klotz, Jr., Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 14/981,694

(22) Filed: Dec. 28, 2015

(65) Prior Publication Data

US 2016/0188719 A1    Jun. 30, 2016

Related U.S. Application Data

(60) Provisional application No. 62/097,508, filed on Dec. 29, 2014.

(51) Int. Cl.
*G06F 17/30* (2006.01)
*G06F 17/22* (2006.01)
*G06Q 30/02* (2012.01)

(52) U.S. Cl.
CPC .... *G06F 17/30864* (2013.01); *G06F 17/2235* (2013.01); *G06F 17/3053* (2013.01); *G06F 17/3087* (2013.01); *G06F 17/30554* (2013.01); *G06F 17/30598* (2013.01); *G06F 17/30867* (2013.01); *G06Q 30/0257* (2013.01); *G06Q 30/0261* (2013.01); *G06Q 30/0275* (2013.01)

(58) Field of Classification Search
CPC ....................................................... G06F 17/30
USPC ................................................... 707/706, 737
See application file for complete search history.

(56) References Cited

U.S. PATENT DOCUMENTS

| | | | |
|---|---|---|---|
| 9,143,614 B2* | 9/2015 | Williams | H04M 3/42195 |
| 9,152,674 B2* | 10/2015 | Glover | G06F 17/3053 |
| 9,418,103 B2* | 8/2016 | Shapira | G06F 17/30395 |
| 9,436,730 B2* | 9/2016 | Li | G06F 21/554 |
| 9,491,229 B1* | 11/2016 | Lachwani | H04L 67/10 |
| 9,720,672 B2* | 8/2017 | Lipton | G06F 9/445 |
| 9,830,387 B2* | 11/2017 | Haddock | G06F 17/30864 |
| 9,870,405 B2* | 1/2018 | Gannu | G06F 17/30702 |
| 9,898,372 B2* | 2/2018 | Brewer | G06F 11/1458 |
| 2009/0055523 A1 | 2/2009 | Song et al. | |

(Continued)

*Primary Examiner* — Kim T Nguyen
(74) *Attorney, Agent, or Firm* — Jefferson IP Law, LLP

(57) ABSTRACT

A deep linking system includes a search engine including a processing system and a storage system that stores a plurality of application records and a plurality of cluster records. The processing system includes one or more processors that execute computer-readable instructions causing the processing system to receive a search query containing one or more query terms from a remote device and identify a consideration set of application records from the plurality of application records based on the search query. For each application record, the instructions cause the processing system to determine one or more clusters from a plurality of clusters to which the state of the respective software application belongs based on a function identifier of the application record and determine a result score of the application record based on contents of the application record and one or more cluster records respectively corresponding to the one or more clusters.

16 Claims, 11 Drawing Sheets

(56) References Cited

U.S. PATENT DOCUMENTS

| | | |
|---|---|---|
| 2011/0040756 A1 | 2/2011 | Jones et al. |
| 2012/0254188 A1 | 10/2012 | Koperski et al. |
| 2014/0052645 A1 | 2/2014 | Hawes et al. |
| 2014/0316890 A1 | 10/2014 | Kagan |
| 2017/0329591 A1 | 11/2017 | Lipton et al. |

* cited by examiner

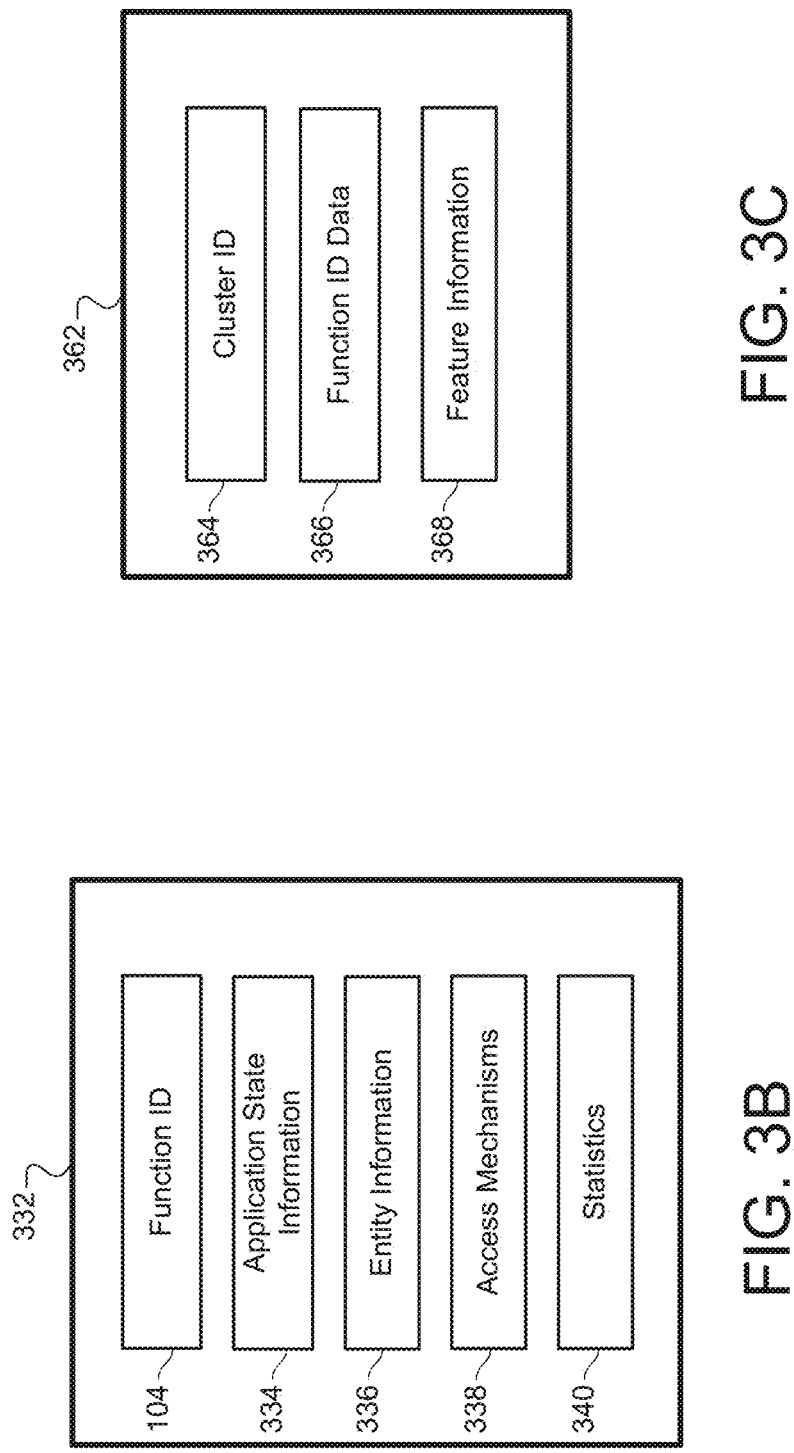

GENERATING SEARCH RESULTS BASED ON CLUSTERED APPLICATION STATES

CROSS-REFERENCE TO RELATED APPLICATIONS

This application claims the benefit of U.S. Provisional Application No. 62/097,508, filed on Dec. 29, 2014. The entire disclosure of the application referenced above is incorporated herein by reference.

TECHNICAL FIELD

This disclosure relates to clustering states of software applications and using the clusters to improve relevancy of search results.

BACKGROUND

Many software applications offer multiple functions to users. Further, most users do not use all the functions of a software application. For example, a restaurant related software application may offer the following functions: "find restaurants by cuisine," "view photographs of dishes," "search menus of restaurants," and "read reviews of specific restaurants." Most users of this software application, however, may only really utilize the "view photographs of dishes" function. Another software application may offer similar functions; however, users of the other application may overwhelmingly prefer the "find restaurants by cuisine" and "read reviews of specific restaurants" functions of this application.

SUMMARY

In one example, a method includes storing a plurality of application records, each application record including i) a function identifier that indicates a state of a respective software and ii) application state information corresponding to the state of the software application. The method further includes storing a plurality of cluster records. In this example, each cluster record defines a respective cluster of a plurality of clusters. Each cluster includes a respective plurality of clustered function identifiers and each clustered function identifier identifies a state of a respective software application. The method includes clustering the plurality of clusters according to one or more features. The method further includes receiving a search query containing one or more query terms from a remote device. The method includes identifying a consideration set of application records from the plurality of application records based on the search query. In this example, each application record indicates a state of a respective software application that matches to at least one of the query terms. The method further includes, for each application record in the consideration set, identifying one or more cluster records from the plurality of cluster records using the function identifier of the application record. The one or more cluster records identified by the method for each application record respectively indicate one or more clusters to which the state of the software application defined by the application record belongs. The method further includes, for each application record in the consideration set, determining a result score of the application record based on the contents of the application record and the one or more cluster records respectively corresponding to the one or more clusters. The method includes generating search results based on the application records in the consideration set and result scores thereof. The method additionally includes transmitting the search results to the remote device.

In another example, a system includes one or more computing devices configured to store a plurality of application records, each application record including i) a function identifier that indicates a state of a respective software application and ii) application state information corresponding to the state of the software application. The computing devices are further configured to store a plurality of cluster records. In this example, each cluster record defines a respective cluster of a plurality of clusters identified by the computing devices. In this example, each cluster includes a respective plurality of clustered function identifiers and each clustered function identifier identifies a state of a respective software application. The computing devices are configured to cluster the plurality of clusters according to one or more features. The computing devices are further configured to execute a search engine that receives a search query containing one or more query terms from a remote device. The computing devices are configured to identify a consideration set of application records from the plurality of application records based on the search query. In this example, each application record indicates a state of a respective software application that matches to at least one of the query terms. The computing devices are further configured to, for each application record in the consideration set, identify one or more cluster records from the plurality of cluster records using the function identifier of the application record. The one or more cluster records identified by the computing devices for each application record respectively indicate one or more clusters to which the state of the software application defined by the application record belongs. The computing devices are further configured to, for each application record in the consideration set, determine a result score of the application record based on the contents of the application record and the one or more cluster records respectively corresponding to the one or more clusters. The computing devices are configured to generate search results based on the application records in the consideration set and the result scores thereof. The computing devices are additionally configured to transmit the search results to the remote device.

In another example, a non-transitory computer-readable storage medium includes instructions that cause one or more computing devices to store a plurality of application records, each application record including i) a function identifier that indicates a state of a respective software application and ii) application state information corresponding to the state of the software application. The instructions further cause the one or more computing devices to store a plurality of cluster records. In this example, each cluster record defines a respective cluster of a plurality of clusters identified by the one or more computing devices. In this example, each cluster includes a respective plurality of clustered function identifiers and each clustered function identifier identifies a state of a respective software application. The instructions further cause the one or more computing devices to execute a search engine that receives a search query containing one or more query terms from a remote device. The instructions cause the one or more computing devices to identify a consideration set of application records from the plurality of application records based on the search query. In this example, each application record indicates a state of a respective software application that matches to at least one of the query terms. The instructions further cause the one or more computing devices to, for each application record in the consideration set, identify one or more cluster records from the plurality of cluster records using the function identifier of the application record. Each of the identified one or more cluster records respectively indicates one or more clusters to which the state of the software application defined by the application record belongs. The instructions further cause the one or more computing devices to, for each application record in the consideration set, determine a result score of the application record based on the contents of the application record and the one or more cluster records respectively corresponding to the one or more clusters. The instructions cause the one or more computing devices to generate search results based on the application records in the consideration set and result scores thereof. The instructions additionally cause the one or more computing devices to transmit the search results to the remote device.

DESCRIPTION OF DRAWINGS

FIG. 3B is a schematic view of an example application state record.

FIG. 3C is a schematic view of an example cluster record.

Like reference symbols in the various drawings indicate like elements.

DETAILED DESCRIPTION

Figure 1A:
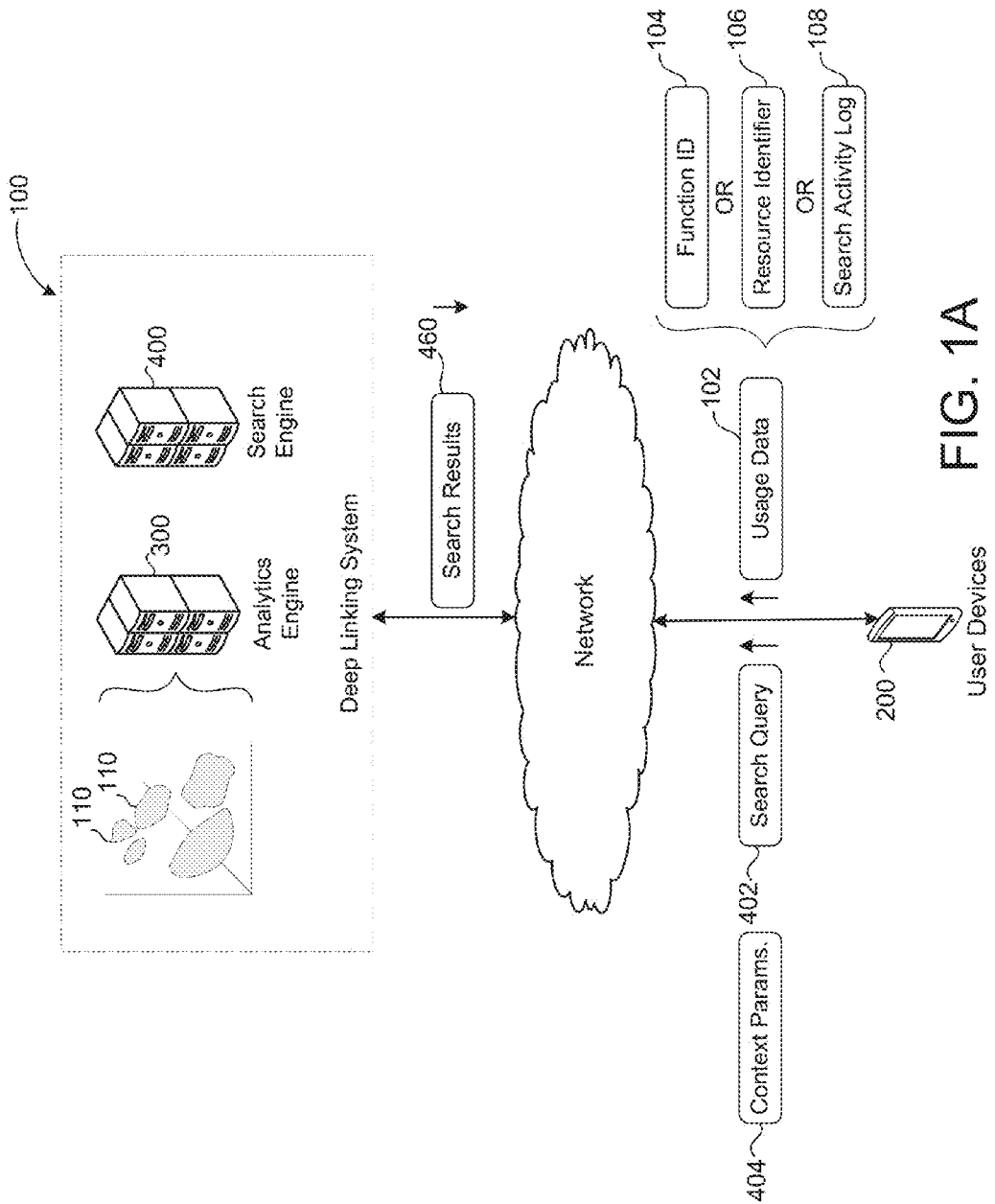
FIG. 1A is a schematic view of an example environment of a deep-linking system.

FIG. 1A illustrates an example environment 10 of a deep-linking system 100. A deep-linking system 100 is a collection of computing devices that generates user-selectable links that link to states of software applications and provides the user-selectable links to one or more user devices 200. A user selectable link (or link) is an object that is displayed by a user device 200 that includes one or more underlying access mechanisms (described in greater detail below). When a user selects a user selectable link, the user device 200 can access a state of a software application using an access mechanism included in the selected link. While the user device 200 in FIG. 1A is depicted as a smartphone, a user device 200 can be any suitable user computing device including, but not limited to, a tablet computing device, a personal computing device, a laptop computing device, a gaming device, a vehicle infotainment device, and/or a smart appliance (e.g., smart refrigerator or smart television).

In the illustrated example, the deep-linking system 100 includes an analytics engine 300. The analytics engine 300 collects usage data 102 from a plurality of user devices 200. Usage data 102 can include any data that indicates the states of software applications that a user device 200 is accessing. Additionally or alternatively, usage data 102 can indicate a search activity log 108, which indicates individual search results that were selected by a user of the user device 200 given a respective search query 402. Put another way, the search activity log 108 indicates states of software applications that a user accessed when presented with search results 460 in response to a search query 402. As the individual search results link to different states of one or more software applications, the selection of an individual search result can be indicative of a state of a software application that the user found relevant given a particular search query. Selection of the individual search result causes the user device 200 to access a state of a software application using an edition of the software application. A state of a software application may be represented by a function identifier 104 (or "function ID") or a resource identifier 106 (both of which are described in greater detail below). The analytics engine 300 receives the usage data 102 and identifies different clusters 110 of states of software applications.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) via the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using native application editions of the software application and/or web application editions of the software application.

A native application edition (or "native application") is, at least in part, installed on a user device 200. In some scenarios, a native application is installed on a user device 200, but accesses an external resource (e.g., an application server) to obtain data and/or instruction from the external resource. For example, social media applications, weather applications, news applications, and search applications may respectively be accessed by one or more native application editions that execute on various user devices 200. In such examples, a native application can provide data to and/or receive data from the external resource while accessing one or more functions of the software application. In other scenarios, a native application is installed on the user device 200 and does not access any external resources. For example, some gaming applications, calendar applications, media player applications, and document viewing applications may not require a connection to a network to perform a particular function. In these examples, the functionality of the software application is encoded in the native application editions itself. The native application edition is able to access the functions of the software application without communicating with any other external devices.

Web application editions (also referred to as "web applications") of a software application may be partially executed by a user device 200 (e.g., by a web browser executed by the user device 200) and partially executed by a remote computing device (e.g., a web server or application server). For example, a web application may be an application that is executed, at least in part, by a web server and accessed by a web browser (e.g., a native application) of the user device 200. Example web applications may include, but are not limited to, a web-based email client, an online auction website, a social-networking website, travel booking websites, and online retail websites. A web application accesses functions of a software product via a network. Examples implementations of web applications include websites and/or HTML-5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. For example, a restaurant review application may have reviews of thousands of restaurants and may also provide an on-line ordering function from some of the restaurants. The restaurant review application may be accessed by a first native application edition configured for a first operating system (e.g., the ANDROID operating system maintained by Google, Inc.), a second native application edition configured for a second operating system (e.g., the IOS operating system developed by Apple, Inc.), and a web application edition (e.g., a website) of the restaurant review application. The restaurant review application may allow all the editions (native and web) to access the various reviews of restaurants but may only allow on-line orders to be placed using the native application editions. In this way, some states or functions of the restaurant review application cannot be accessed by the web application edition but there is overlap between the states or functions that can be accessed by the native application editions and the web application edition.

A state of a software application can refer to a parameterized function of the software application. A software application can perform one or more functions. A function may refer to a service of the software application that can be accessed by a user device 200 via an edition of the software application. Non-limiting examples of functions can include "making a restaurant reservation" (which may parameterized with a restaurant identifier, a date, and a time), "searching for a cuisine" (which may be parameterized with a cuisine type and a location), "view flight prices" (which may be parameterized with departure and arrival airport codes, arrival and departure dates, and round trip flags), "request a driver" (which may be parameterized with a pick-up location), and "view a file" (which may be parameterized with a file identifier). A state of a software application can be accessed from a user device using an edition of the software application. An operating system of a user device 200 can instruct an edition of a software application to access a state of the software application using an access mechanism (e.g., a resource identifier 106). In some implementations, the state of a software application may be represented by a function ID 104.

A user device 200 can access a state of a software application via an edition of the software application using an access mechanism. When rendering a user selectable link (e.g., in the set of search results 460) a user device 200 displays the user selectable link such that it can be selected by a user of the user device 200. A user selectable link may include one or more underlying access mechanisms. A user selectable link, when selected by a user, causes the user device 200 to access a state of the software application using an edition of the software application identified by the access mechanism.

Examples of access mechanisms can include, but are not limited to, application access mechanisms, web access mechanisms, application download addresses, and scripts. An application access mechanism may be a string that includes a reference to a native application (e.g., a custom namespace of the software application specific to one or more native application editions of the software application) and indicates one or more operations for the user device 200 to perform. If a user selects a user selectable link including an application access mechanism, the user device 200 may launch the native application referenced in the application access mechanism and perform the one or more operations indicated in the application access mechanism. In some implementations, any combination of the operating system of the user device 200, a search application executed by the user device 200, a native application executed by the user device 200, and/or a web browser executed by the user device 200 can launch the native application referenced in the application access mechanism An application resource identifier is an example application access mechanism. Some software applications may have a common scheme for accessing all of their respective native application editions. In such scenarios, a single application resource identifier may access multiple native application editions.

A web access mechanism may be a string that includes a reference to a web application edition of a software product, and indicates one or more operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user selectable link including a web access mechanism, the user device 200 may launch a web browser application and may pass the resource identifier to the web browser. The web browser can utilize the resource identifier to retrieve the web resource indicated in the resource identifier and/or access a function of the software application indicated by the resource identifier.

An application download access mechanism may indicate a location (e.g., a digital distribution platform) where a native application can be downloaded in the scenario where a native application edition of the application is not installed on the user device 200. If a user selects a user selectable link including an application download access mechanism, the user device 200 may access a digital distribution platform from which the referenced native application edition may be downloaded. The user may opt to download the native application edition. Upon doing so, the user device 200 may launch the native application edition and may access the state of the software application using the native application edition and an application access mechanism associated with the user selectable link. Put another way, the user device 200 can set the state of the downloaded native application edition to the state indicated by the access mechanism.

A script is a set of instructions, that when executed by the user device 200 cause the user device to access a resource indicated by the script. For example, the script may instruct an operating system of the user device 200 to launch the native application, and may define one or more additional instructions to access a particular state of the application. A script may be used instead of another type of access mechanism when an application is not configured to be referenced by the other types of access mechanisms.

As previously described, a function ID 104 is a string of alphabetic, numeric, and/or symbolic characters (e.g., punctuation marks) that uniquely identifies a state of an application. Put another way, a function ID 104 is a unique reference to a state of an application. In some implementations, a function ID 104 can be in the format of a resource identifier. For example, the function ID 104 may be a uniform resource locator (URL) or an application resource identifier. In these implementations, the function ID 104 may be used by a user device to access a software application via a web application edition or one or more native application editions of the software application, respectively.

In some implementations, a function ID 104 can map to one or more access mechanisms. In these implementations, a function ID 104 may map to a web resource identifier (e.g., a URL), one or more application resource identifiers, and/or one or more scripts. For instance, a state of an example software application, "exampleapp," may be accessed via a web application edition and two native application editions (e.g., an edition configured for the ANDROID operating system and an edition configured for the WINDOWS PHONE operating system). In this example, the web resource identifier may be www.exampleapp.com/param1=abc¶m2=xyx, the first application resource identifier may be android.exampleapp::param1=abc¶m2=xyx, and the second application resource identifier may be windows.exampleapp::param1=abc¶m2=xyx. In this example, a function ID 104 may map to the web resource identifier and the two application resource identifiers.

In some implementations, a function ID 104 may have a URL-like structure that utilizes a namespace other than http://, such as "func://" which indicates that the string is a function ID 104. In the example of "exampleapp" above, the function ID 104 corresponding to the example state may be func://exampleapp::param1=abc¶m2=xyx, which may map to the access mechanisms described above. In this example, the function ID 104 can be said to be parameterized, whereby the value of "param1" is set to "abc" and the value of "param2" is set equal to "xyz."

In some implementations, a function ID 104 may take the form of a parameterizable function. For instance, a function ID 104 may be in the form of "app_id[action(param_1, param_2, . . . , parameter_n)]", where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, a function ID 104 may be "exampleapp[example_action(abc, xyz)]". In this example, the function ID 104 can be said to be parameterized, whereby the value of "param1" is set to "abc" and the value of "param2" is set equal to "xyz." Given this function ID 104 and the referencing schema of the example application, the foregoing function ID 104 may be used to generate or look up the access mechanisms defined above. Furthermore, while function IDs 104 have been described with respect to resource identifiers, a function ID 104 may be used to generate or look up one or more scripts that access a state of a software application. Further, a function ID 104 may take any other suitable format. For example, the function ID 104 may be a human-readable string that describes the state of the application to which the function ID 104 corresponds.

As previously mentioned, the analytics engine 300 collects usage data 102 from a plurality of user devices 200, whereby the usage data 102 can indicate a resource identifier 106, a function ID 104, and/or search activity log 108. In some implementations, the analytics engine 300 identifies the states of software applications accessed by users of user devices 200 that provided the usage data 102. The usage data may be anonymized, thereby minimizing risks to users' privacy. A user device 200 can be configured to collect and transmit usage data 102 only when a user explicitly agrees to share such usage data 102.

In some implementations, the analytics engine 300 generates or updates application state records 332 (FIG. 3B) corresponding to the received usage data 102. As will be discussed, an application state record corresponds to a particular state of a software application. In some implementations, the application state record includes a function ID 104 corresponding to the state as well as a set of features. The features can include ontological features corresponding to the state and/or statistical features regarding the state. For example, ontological features of the state may include entity information as well as function information (e.g., view menu or make flight reservation).

Entity information 336 corresponding to a state of a software application can define one or more entities corresponding to the state and the entity types of the respective entities. An entity can refer to a value (e.g., a noun or number) that is known to the deep-linking system 100 and able to be categorized by an ontology of the deep-linking system 100. An entity type can refer to a categorization of an entity. An entity can have more than one entity type. For example, the entity "New York Yankees" may have the entity types "professional sports team," "New York professional sports team," and "Major League Baseball team" associated therewith. Furthermore, entity types may be subtypes of other entity types. For example, the entity type "New York professional sports teams" may be a subtype of the entity type "professional sports teams." As will be discussed in greater detail below, the relationship between entities and entity types may be defined in accordance with an entity ontology (FIG. 3D).

Functional information corresponding to a state of an application can define a function performed by the software application when in the given state. In some implementations, a given state can perform more than one function (e.g., make reservations for a restaurant and see reviews of the restaurant). The functional information corresponding to a known collection of software applications may be defined according to a functional ontology, which is discussed below (FIG. 3E).

An application state record 332 can further include statistics 340 which can represent any statistics regarding a state of a software application. The statistics may be based, at least in part, on the usage data 102 received by the analytics engine 300. Examples of statistical features may include a value indicating how many times the state of the software application is accessed by user devices and a rate at which the state is accessed. The record may further store geographical features. Geographical features may indicate a location from which the state was accessed and a language corresponding to the state.

The analytics engine 300 can identify clusters of application state records 332 (or function IDs 104 thereof) based on the various features. The process by which a cluster is identified may be referred to as "clustering." In some implementations, the analytics engine 300 clusters application state records based on a specific set of features. For example, the analytics engine 300 may cluster records based on entity types, popularity, and location. The resulting clusters 110 may, for example, result in a first cluster that corresponds to popular states of software applications relating to restaurants in Mountain View, Calif., a second cluster that corresponds to popular states of software applications relating to bars in New York City, and a third cluster that corresponds to unpopular states of software applications relating to restaurants in Des Moines, Iowa. The states of the software applications may be represented by the function IDs 104. Thus, the function IDs 104 in the first cluster may include a function ID 104 identifying a state of a first software application where users can read reviews of a particular restaurant in Mountain View, a second function ID 104 identifying a state of a second software application where users can view a photograph of a particular dish served at a different restaurant in Mountain View, and a third function ID 104 identifying a state of a third software application where users can make a reservation at yet another restaurant in Mountain View.

The analytics engine 300 may identify hundreds, thousands, or millions of clusters, as the analytics engine 300 clusters the application state records 332 with respect to certain set of features. Furthermore, the analytics engine 300 may cluster the application state records with respect to different sets of features, thereby identifying clusters 110 that identify different information. For example, clusters 110 that are identified based on function, geographic location, and time of the day may indicate the types of actions certain users perform on their user devices 200 at certain times of the day. For instance, such clusters may reveal that users in Los Angeles are more likely to view movie reviews on a Friday night than users in San Diego. Implementations of the analytics engine 300 are described in greater detail below.

The deep-linking system 100 may utilize the clusters 110 in performing various tasks. For example, the deep-linking system 100 may include a search engine 400 that leverages the clusters 110 to improve the relevance of the search results 460. In some implementations, the search engine 400 receives a search query 402 and, in some implementations, one or more context parameters 404 and returns search results 460 in response to the search query 402. The search query 402 includes one or more query terms. A context parameter 404 is additional information that may be included with the search query 402, such as a geolocation of the user device 200 at the time of the search query 402, an operating system type of the user device 200, or an identifier of the user of the user device (e.g., a username or profile ID). The user device transmits the search query 402 and zero or more context parameters 404 to the search engine 400. A search engine 400 receives a search query 402 and identifies states of applications that are relevant to the search query 402. In these implementations, the relevance of search results can be improved, for example, when the search engine 400 is aware of the geolocation of the user device 200 that provided the search query 402, states of software applications that somehow relate to the search query 402 (e.g., textual matches between content defined in the state and one or more query terms defined in the search query 302), and clusters 110 of popular states in a geographic location of the user device. Implementations of the search engine 400 are described in greater detail below.

The deep-linking system 100 can provide data and instructions to a user device that causes the user device to render and display user selectable links. In some implementations, individual search results 460 can be communicated in result objects. A result object can contain data and instructions that, when rendered by a user device 200, provide a search result that includes one or more user selectable links. A result object can include a function ID 104 and/or one or more access mechanisms that correspond to a state of a software application. In the former scenario, a user device 200 utilizes the function ID 104 to determine the one or more access mechanisms (e.g., a URL, one or more application resource identifiers, and/or a script). A user selectable link, when selected (e.g., pressed on or clicked on) by a user, instructs the user device 200 to access the resource identified by the underlying access mechanism(s).

Figure 1B:
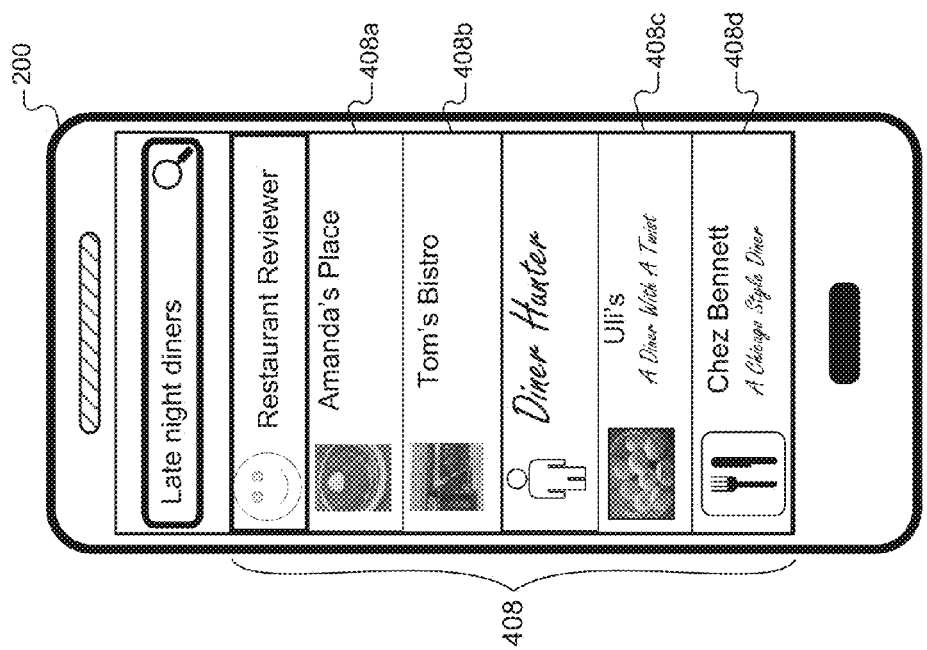
FIG. 1B is a schematics view of a user device displaying example user selectable links.

FIG. 1B illustrates examples of a user device 200 displaying user selectable links. In FIG. 1B the user device 200 is displaying a graphical user interface (hereafter referred to as "GUI") that includes a search engine results page (hereafter referred to as "SERP"). In the illustrated example, the user device 200 is displaying search results 460 responsive to the search query 402 "late night diners." In response to the search query 402, the deep-linking system 100 has provided search results corresponding to two different software applications ("Restaurant Reviewer" and "Diner Hunter"). In the illustrated example, the individual search results 460 are displayed in cards 408 that are user selectable links. Put another way, if a user selects (e.g., presses on) one of the cards 408, the user device 200 can access a state of a software application identified by the card 408. In this example, the search results 460 include a first card 408a that links to a state of the Restaurant Reviewer software application where users can view reviews for a business called "Amanda's Place." The search results 460 further include a second card 408b that links to a state of the Restaurant Reviewer software application where users can view reviews for a business called "Tom's Bistro." The search results 460 also include a third card 408c that links to a state of the Diner Hunter software application where users can view information relating to a business called "Uli's." The search results 460 also include a fourth card 408d that links to a state of the Diner Hunter software application where users can view information relating to a business called "Chez Bennett."

The user selectable links of FIG. 1B are provided for example only and are not intended to limit the scope of the disclosure. Any suitable types of user selectable links may be implemented by the deep-linking system 100.

Figure 2:
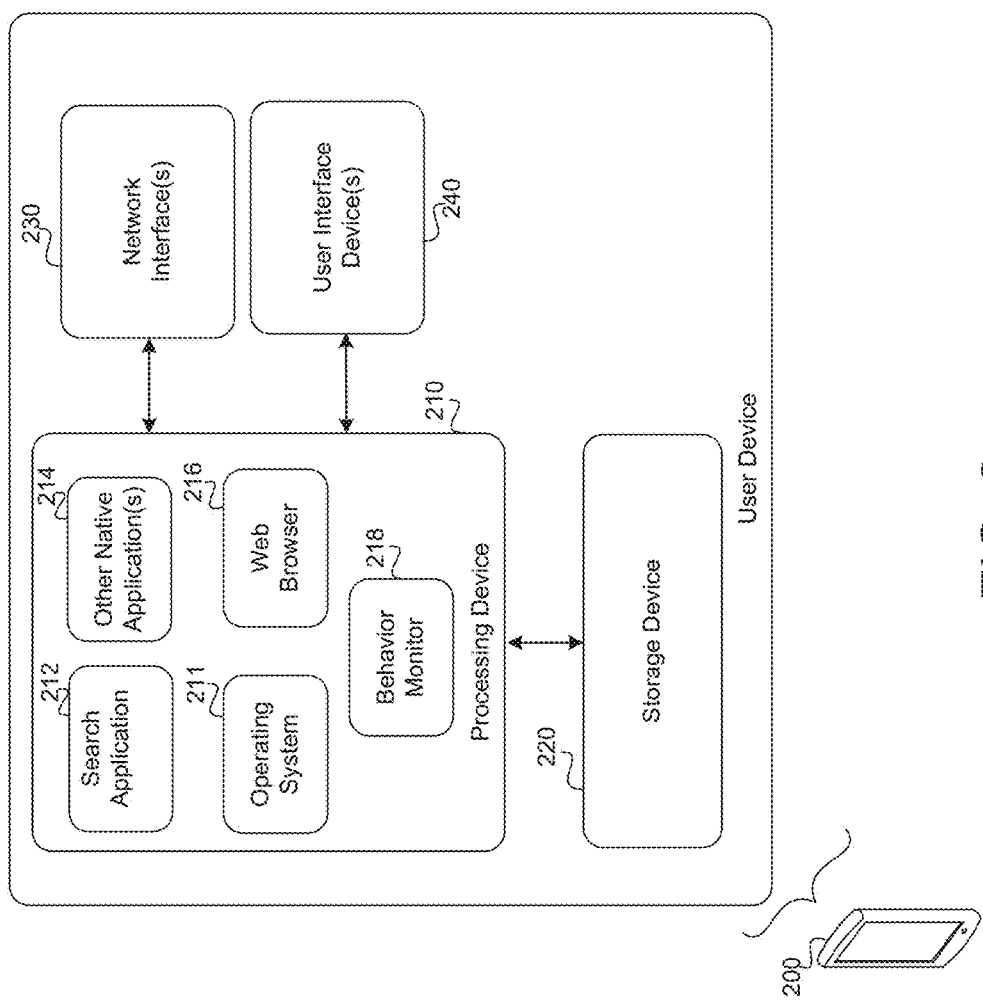
FIG. 2 is a schematic view of example components of a user device

FIG. 2 illustrates an example user device 200 and example components thereof. In the illustrated example, the user device 200 includes a processing device 210, a storage device 220, a network interface 230, and a user interface 240. The user device 200 may include additional components not shown in FIG. 2. The components of the user device 200 may be interconnected by, for example, a bus or other communication circuitry.

The processing device 210 can include one or more processors that execute computer-executable instructions and associated memory (e.g., RAM and/or ROM) that stores the computer-executable instructions. In implementations where the processing device 210 includes more than one processor, the processors can execute in a distributed or individual manner. The processing device 210 can execute an operating system 211, a search application 212 (which may be a native application), one or more native applications 214, a web browser 216, and/or a behavior monitor 218, all of which can be implemented as computer-readable instructions. One or more of the native applications may include a native application module 215 that communicates with the deep-linking system 100.

The storage device 220 can include one or more computer-readable mediums (e.g., hard disk drives, solid state memory drives, and/or flash memory drives). The storage device 220 can store any suitable data that is utilized by the operating system of the user device 200. The storage device 220 can be in communication with the processing device 210, such that the processing device 210 can retrieve any needed data therefrom.

The network interface 230 includes one or more devices that are configured to communicate with the network 150. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

The search application 212 generates and displays a graphical user interface (GUI) that allows users to enter search queries 402 and that renders and displays displayable search results 460 that are responsive to the search queries 402 in the GUI. In some implementations, the search application 212 presents the search results 460 in a SERP (see e.g., FIG. 1B). An individual search result can include a user selectable link. The user can select a user selectable link displayed in the search results 460. In response to the user selection of the user selectable link, the search application 212 instructs the operating system 211 to access the state of the software application corresponding to the selected link.

In operation, the search application 212 receives a search query 402 from a user via a user interface 240. The search application 212 transmits the search query 402 to the search engine 400 via the network interface device 230. In some implementations, the search application 212 generates a query wrapper (not shown) that includes the search query 402 and one or more context parameters 404 (FIG. 1A). A context parameter 404 is additional data that the search engine 400 can utilize to determine the search results 460 (e.g., a geolocation of the user device 200, a user profile identifier, a list of native applications 214 installed on the user device 200).

The search application 212 receives search results 460 from the search engine 400 and renders the displayed search results 460 based thereon. In some implementations, the search results 460 are encoded in container such as an iFrame or a son file (or an analogous format). As previously discussed, the search results 460 can include one or more result objects, whereby each result object corresponds to a result that is to be included in the displayed search results 460. A result object can include one or more access mechanisms, a layout file, and result data. The result data can include the content that is displayed in the search result. Examples of content may be text descriptions of a state of a software application, icons, screenshots of the state, and data used to populate the individual result. For instance, if the result object corresponds to a state of a restaurant review application (e.g., a review of a specific restaurant), the result data may include an icon of the application, a number of star ratings of the restaurant, a price rating (e.g., is the restaurant expensive or cheap), and any information that may be displayed in the user selectable link. The search application 212 renders each result object into a displayed search result and outputs the displayed search results to the SERP. Upon user selection of a user selectable link, the search application 212 can determine an access mechanism corresponding to the selected link and can instruct the operating system 211 of the user device 200 to access the state of the software application indicated by the access mechanism.

The processing device 210 further executes a behavior monitor 218. A behavior monitor 218 is a set of computer-readable instructions that may be a standalone application or may be incorporated into the operating system 211, the search application 212, the web browser 216, and/or any other native applications 214. The behavior monitor 218 monitors the use of the user device 200 and generates usage data 102 based thereon. The behavior monitor 218 may execute as a background process that monitors the current state of the user device and/or monitors a user's response to a set of search results 460.

In some implementations, the behavior monitor 218 monitors the current state of the user device 200. In these implementations, the behavior monitor 218 can monitor the operation of the user device 200 to determine when the user device 200 switches to a state of a software application that is different from the current state. For example, if a user selects a user selectable link displayed in a SERP, the user device 200 may launch a native application and set the state of the native application in accordance with an access mechanism defined in the selected link. In another example, a user may be using a movie database native application to view a bio of a famous actor and may switch the state of the movie database native application to a state that lists start times of newly released movies. In another example, a user may open a media streaming native application and begin playing a song. In all of these examples the user device 200 switches to a different state of a software application from a current state. The different state may be within the same software application (e.g., going from a bio of an actor of a movie to time listings of the movie) or may be across different software applications (e.g., switching from a state within the search application 212 to a state of an unrelated software application listed in a set of search results 460).

Each time the user device 200 switches to a different state, the behavior monitor 218 records the transition and generates usage data 102 corresponding to the different state. In some implementations, the behavior monitor 218 determines a function ID 104 or a resource identifier of the different state. For example, if the behavior monitor 218 is integrated into the operating system 211 or an application edition corresponding to the different state, the behavior monitor can determine a resource identifier 106 indicating the different state. In another example, when the different state is accessed using a web application, the behavior monitor 218 can record the web resource identifier corresponding to the different state.

In some of the implementations where the behavior monitor 218 identifies resource identifiers 106 instead of function IDs 104, the behavior monitor 218 translates the resource identifier 106 into a function ID 104. In some examples, the behavior monitor 218 obtains custom URL schemes of various software applications (e.g., those that are installed on the user device 200). Examples of how to implement a custom URL scheme may be found at, for example, appurl.org, (maintained by Quixey, Inc.). The behavior monitor 218 utilizes the custom URL scheme to translate the resource identifier into a function ID 104.

In some implementations, the behavior monitor 218 monitors the search application 212 to determine activity log data. For example, the behavior monitor 218 can record search queries 402 that a user device 200 transmits to a search engine 400. The behavior monitor 218 can also record a user's reactions to the search results 460 returned in response to the search queries 402. For example, the behavior monitor 218 can identify the user selectable links that were selected by the user. Each user selectable link corresponds to a result object. In some implementations, a result object of a selected link, which links to a state of a software application, can include the function ID 104 of the linked to state. Thus, when the user selects the link, the behavior monitor 218 can obtain the function ID 104 of the linked-to state. The behavior monitor 218 can record the function ID 104 and the search query 402 in the usage data 102.

The behavior monitor 218 identifies additional information. For example, the behavior monitor 218 can determine a date or day of the week, a time, and/or geolocation of the user device 200. The behavior monitor 218 can include the additional data (e.g., an identifier of the different state, a time, a day of the week, and a geolocation) in the usage data 102 of the user device 200.

The behavior monitor 218 transmits the usage data to the analytics engine 300. Prior to transmission, the behavior monitor 218 can scrub the usage data 102 to remove any data that may be used to identify the user of the user device 200. The behavior monitor 218 can transmit the usage data 102 at each state transition or at predetermined intervals (e.g., every five minutes, every six hours, every day). In order to further protect the privacy of the user, the behavior monitor 218 may purge the collected usage data 102 from memory (e.g., from the storage device 220) each time it transmits the usage data 102 to the analytics engine 300.

Figure 3A:
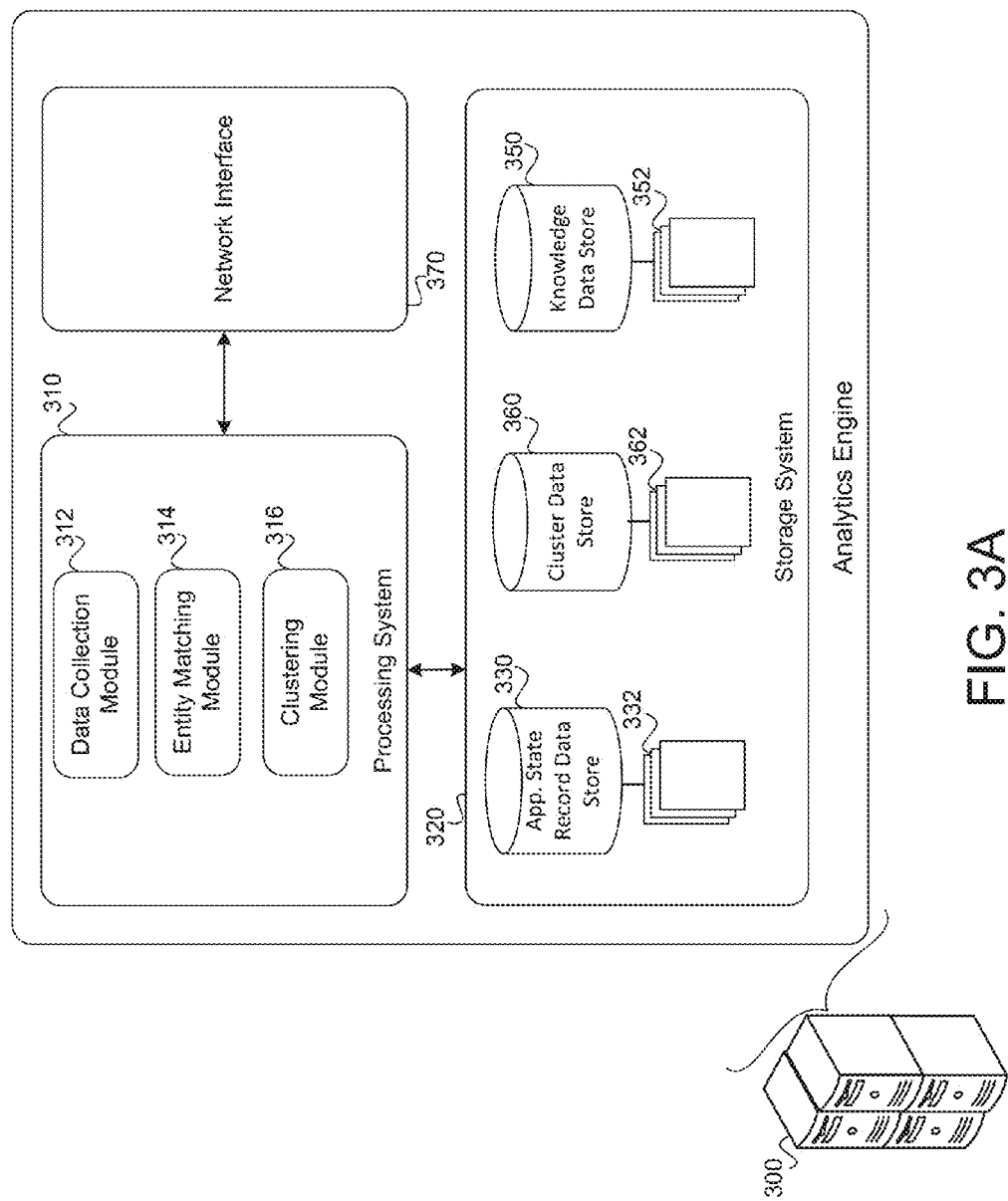
FIG. 3A is a schematic view of example components of an analytics engine.
Figure 3D:
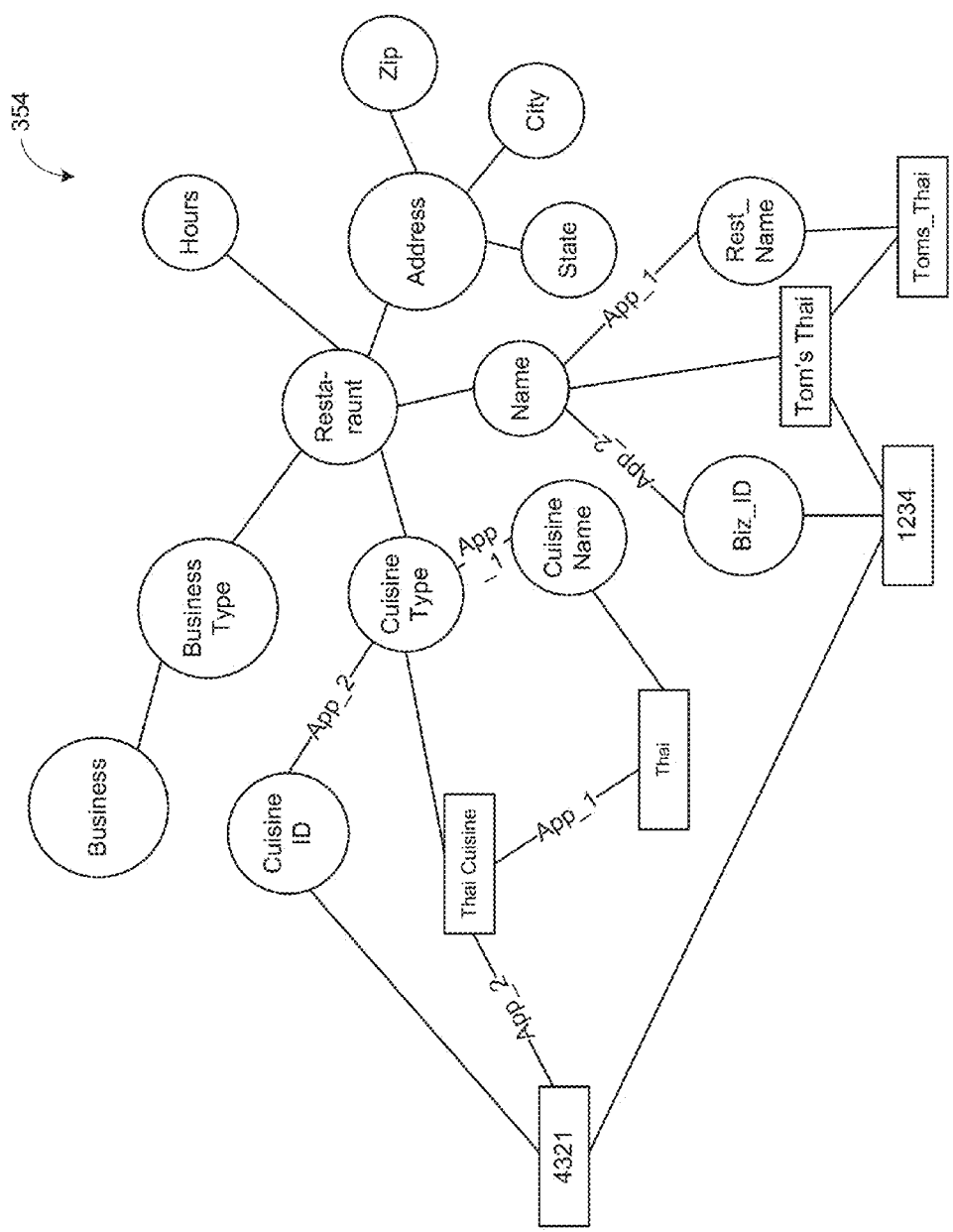
FIG. 3D is a schematic view of an example entity ontology.
Figure 3E:
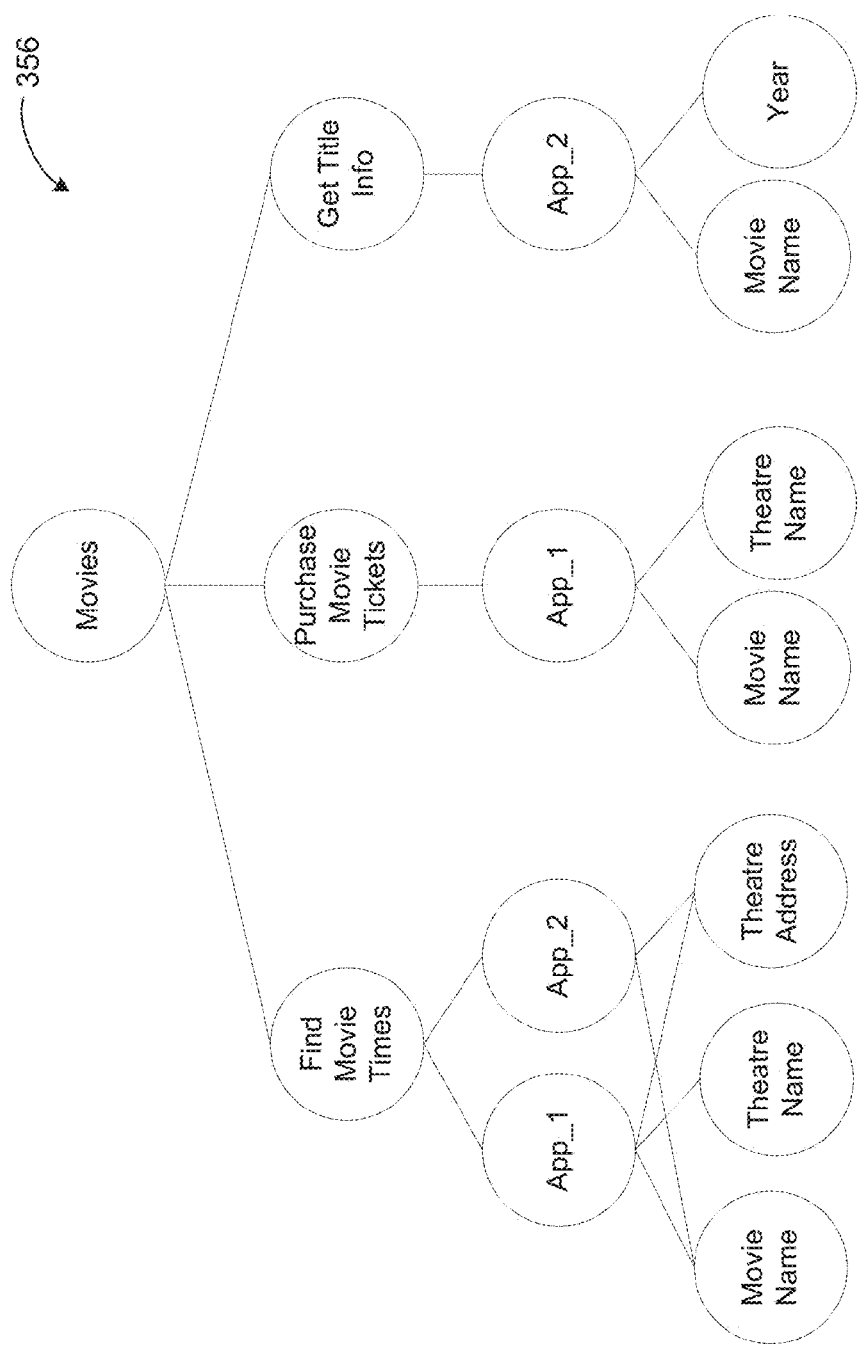
FIG. 3E is a schematic view of an example functional ontology.

FIG. 3A illustrates example components of an analytics engine 300. The analytics engine 300 receives usage data 102 from a plurality of user devices 200. In the illustrated example the analytics engine 300 includes a processing system 310, a storage system 320, and a network interface 370. The analytics engine may include additional components not explicitly shown in FIG. 3A. The components of the analytics engine 300 may be interconnected, for example, by a bus and/or any other form or medium of digital data communication, e.g., a communication network 150.

The processing system 310 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing system executes a data collection module 312, an entity matching module 314, and a clustering module 316.

The network interface device 370 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 320 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 320 stores an application state record data store 330, a knowledge data store 350, and a cluster record data store 360. Example contents of the respective data stores 330, 350, 360 are discussed in detail below.

The application state record data store 330 includes a plurality of different application state records 332. FIG. 3B illustrates an example state record 332. Each state record 332 may include data related to a state of the software application resulting from performance of the function. In some implementations, a state record 332 includes a function identifier (ID) 104, application state information 334, entity information 336, one or more access mechanisms 338 used to access the state of the software application, and state statistics 340. The application state data store 330 may include one or more databases, indices (e.g., inverted indices), tables, files, or other data structures which may be used to implement the techniques of the present disclosure.

The function ID 104 may be used to identify the application state record 332 among the other state records 332 included in the application state data store 330. The function ID 104 may be represented in any suitable format, as described above. An application state record 332 further includes one or more access mechanisms 338. The access mechanism(s) 338 may include one or more application access mechanisms, one or more web access mechanisms, one or more application download addresses, and/or one or more scripts. A user device 200 may use the one or more application access mechanisms and the one or more web access mechanisms to access the same state of the software application using a corresponding edition of the software application. For example, the user device 200 may use the different access mechanism(s) 338 to retrieve similar information, play the same song, or play the same movie. The application download addresses may indicate locations where the native application editions referenced in the application access mechanisms can be downloaded.

The application state information 334 may include data that describes the application state to which the record corresponds. The state of the application may be accessed by an edition of the software application using one of the access mechanisms 338 in the application state record 332. Additionally, or alternatively, the application state information 334 may include data that describes the function performed according to the access mechanism(s) 338 included in the application state record 332. The application state information 334 may include a variety of different types of data. For example, the application state information 334 may include structured, semi-structured, and/or unstructured data.

In some implementations, the application state information 334 may include the content that is provided in a result object. The content corresponds to the data provided by a software application when the software application is set in the application state defined by the access mechanism(s) 338 defined in the application state record 332. The types of data included in the application state information 334 may depend on the type of information associated with the application state and the functionality defined by the access mechanism(s) 338. For example, if the application state record 332 is for an application that provides reviews of restaurants, the application state information 334 may include information (e.g., text and numbers) related to a restaurant, such as a category of the restaurant, reviews of the restaurant (e.g., textual reviews and/or a star rating), and a price rating of the restaurant. In another example, if the application state record 332 is associated with a shopping application, the application state information may include data that describes products (e.g., names, ratings, and prices) that are shown when the shopping application is set to a state defined by an access mechanism(s) 338 stored in the record 332.

The application state information 334 may further define the function performed by the software application when set to the state. The application state information 334 may include a name of an action that is performed by the software application. The application state information 334 may also define the types of parameters that the software application receives in order to access the state. For example, if a state of a software application allows a user to view a particular photograph or file, the action may be "view document" and the software application may require a "filename" parameter in order to access the state.

The entity information 336 defines the entities and entity types corresponding to the state of the software application defined by the application state record 332. The entities may be entities that are identified in the content corresponding to the state of the software application or entities that can be accepted by the software application when set to the state of the software application. For instance, if a state record 332 defines a state of a shopping application where a user can purchase a particular product, the entities may be a name of the product, a maker of the product, and a price of the product. In another example, the application state record 332 may correspond to a state of an airline application where a user can make flight reservations. In this example, the entities may include all known airport codes that the airline flies in and out of. The entity types may be the entity types of the entities defined in the entity information. As previously discussed, an entity may have multiple entity types.

The entity information 336 may further include geographic entities relating to the state of the software application. For example, if the state of a software application refers to a restaurant in a particular city, the geographic entities may include the city, the state, and/or the country of the restaurant. In another example, if the state of a software application allows a user to purchase a particular product, the geographic entity may identify countries where the product may be shipped or countries where the state of the software application may accessed. To the extent the state of the software application is not limited by geography (e.g., a level of a game), the entity information 336 may identify the state as having global relevance. The entity information 336 may further include time related information. For example, the time related entities may indicate a date of publication.

The statistics 340 can define statistics relating to the state of the software application. Examples of the statistics are the number of times the state of the software application is accessed, how often (on average) the state is accessed over a period of time (e.g., per hour or per day), the times of the day when the state is accessed, how many times the state is accessed for each day of the week, and the geolocations of the user devices when the state is accessed. The statistics can include any other additional statistics relating to the state of the software application.

The knowledge data store 350 stores a knowledge base 352. In some implementations, the knowledge base 352 includes one or more entity tables. In these implementations, an entity table is a lookup table that relates a term or combination of terms to the possible entity types of the term or combination of terms. Each relation can also have an associated entity score that is a probability value that indicates a likelihood that the term is of that entity type. The entity scores can be determined, for example, heuristically by analyzing large sets of text and documents.

The knowledge base 352 can include any other additional or alternative data structures. For example, in some implementations at least a portion the knowledge base 352 is structured in accordance with an entity ontology 354 (FIG. 3D) and/or a functional ontology (FIG. 3E). FIG. 3D illustrates an example of an entity ontology 354. The entity ontology 354 may define a formal framework for expressing relationships between different items in the knowledge base 352. The entity ontology 354 may define relationships between general entity types to app-specific entity types. For example, the "name" general entity type may relate to a "Biz ID" app-specific entity type for a first software application and "Rest name" app-specific entity type for a second software application. In this way, the first software application's schema refers to a restaurant name as "Biz ID" and the second software application's schema refers to a restaurant name as "Rest name." Furthermore, entity types may relate to other entity types. For example, the general entity type "Thai cuisine" may reference an "Asian cuisine" entity type as Thai cuisine may be thought of as a subclass of "Asian Food." Further, the entity type "restaurant" entity type may relate to an "address" entity type, a "cuisine" entity type, and any other relevant classifications. An "address" entity type may include a "street address" entity type, a "state" entity type, a "city" entity type, and a "zip code" entity type. The knowledge base 352 includes data points that populate the ontology. For example, the string "Thai" may be related to the "Thai cuisine," while the string "Tom's Thai" may relate to "Thai cuisine" entity type and "restaurants" entity type. As the analytics engine 300 learns about new entities, the analytics engine 300 can connect the new entity to its corresponding entity types. In this way, the knowledge base 352 indicates how an entity relates to other entities and the entity type(s) of the entity given the entity ontology 354. For instance, the entity "Tom's Thai" may be linked to a state entity "California," a city entity "Mountain View," and a zip code entity "94040." As will be discussed, a search query 402 including the query terms "tom's thai" that was received from a location near Mountain View, Calif. would likely be interpreted as implicating the "Tom's Thai" entity. Furthermore, as the ontology also includes app-specific entities, the analytics engine 300 is able to represent the restaurant name "Tom's Thai" in a manner that is understood by third party applications (e.g., "1234" for a first application and "Toms_Thai" for a second application). In some implementations, the ontology and its corresponding data points (i.e., the specific entities) may be indexed and stored in the knowledge base 352. For example, the analytics engine may index the ontology and corresponding data points into one or more entity tables. In these implementations, components of the analytics engine 300 can query the entity tables with a query term, and if the query term (or combination of query terms) is listed in the entity table as an entity, the entity table returns to potential entity type(s) of the query term (or query terms). The example ontology of FIG. 3D is provided for example only. A typical ontology may be much larger with thousands or millions of entities. The ontology may have any other suitable structure.

FIG. 3E illustrates an example of a portion of a knowledge base 352 that is structured according to a functional ontology 356. A functional ontology can define the relationships between known verticals, functions that support the vertical, the software applications that perform those functions, and the entity types that the software applications require in order to perform the function. The example of FIG. 3E relates to a vertical focused on movies. Typical functions relating to movies are purchasing movie tickets, finding listings of times a movie is playing, finding information about the title, streaming a movie, finding reviews of a movie, and finding information on actors and actresses. In the illustrated example, the knowledge base identifies purchasing movie tickets, finding listings of times a movie is playing, finding information of the title as possible functions associated with the movie vertical. A first software application (App_1) and a second software application (App_2) can be used to find movie times. The first software application can also be used to purchase tickets and the second software application can be used to get information about a movie. According to the knowledge base 352 the first software application requires a movie name entity, a theatre name entity, and an address entity in order to perform the purchase movie tickets function. Further, the knowledge base 352 indicates that the second software application requires a movie name entity and an address to perform the purchase movie tickets function. The example of FIG. 3E is a simplified example of the movie vertical. The functional ontology 356 may include any number of verticals and any number of functions defined therein. Furthermore, the functional ontology 356 may be structured in other suitable manners.

The cluster data store 360 stores cluster records 362. Each cluster record 362 relates to a unique cluster 110 identified by the analytics engine 300. FIG. 3C illustrates an example of a cluster record 362. A cluster record may include a cluster ID 364, function ID data 366, and feature information 368.

A cluster ID 364 may be a string made up of letters, numbers, and/or characters that identify a cluster 110 from other clusters 110. The cluster ID 364 may be a random value (a random arrangement of letters and numbers) or a human understandable value (e.g., a name of the cluster). As will be discussed, when the clustering module 316 identifies a new cluster 110, the clustering module 316 can create a new cluster record 362 and can assign a new cluster ID 364 to the new cluster record 362.

The function ID data 366 identifies the states of the software application(s) that belong to the cluster. The states of the software applications may be represented by function IDs 104. Thus, the function ID data 366 can define the function IDs that were included in the cluster 110 corresponding to the cluster record 362.

The feature information 368 identifies the features that were used to identify the cluster 110 corresponding to the cluster record 362. As will be discussed, the clustering module 316 can cluster states of applications based on different features. Thus, the feature information 368 can define the features that were used to identify the cluster 110 defined by the cluster record 362. For example, the feature information 368 of a particular cluster record 362 may indicate that the cluster was clustered according to entity type, location, time of day, and popularity. In another example, the feature information 368 of a cluster record 362 may indicate that the cluster 110 was clustered according to whether or not the application state corresponds to an eatery, cuisine type, geolocation, and popularity.

The data collection module 312 receives usage data 102 from a plurality of user devices 200. In some implementations, the data collection module 312 generates and/or updates state records 332 based on the usage data 102. When the data collection module 312 receives usage data 102 from a user device 200, the data collection module 312 identifies one or more states of one or more software applications accessed by a user device 200. As previously discussed, the state of the software application may be represented in the usage data 102 by a function ID 104 or a resource identifier 106. In the case that the state is represented by a resource identifier 106, the data collection module 312 can translate the resource identifier 106 to a function ID 104 using the custom URL scheme of the software application to which the resource identifier 106 corresponds.

For each state of a software application identified in the usage data 102, the data collection module 312 determines whether the application state data store 330 includes a state record 332 corresponding to the state. For instance, the data collection module 312 can search the application state record data store 330 using the function ID 104 representing a particular state. If the data collection module 312 finds a state record 332 corresponding to the function ID 104, the data collection module 312 can update the statistics 340 of the application state record 332 with information contained in the usage data 102. For instance, the data collection module 312 can increment a total number of times that the state was accessed, can indicate a time that the state was accessed, a geolocation from which the state was accessed, and a day of the week that the state was accessed.

In the event that the data collection module 312 does not find a state record 332 corresponding to a function ID 104, the data collection module 312 can create a new state record 332 corresponding to the state of the software application represented by the function ID 104. The data collection module 312 can further instruct a crawler (not shown) to crawl the software application at the given state, so as to identify the application state information 334 and the access mechanisms used to access the state. The data collection module 312 can also update the statistics of the new application state record 332 in the manner described above.

In the event the data collection module 312 creates a new state record 332, the entity matching module 314 can identify the ontological features of the new state record 332. In some implementations, the entity matching module 314 obtains ontological features corresponding to the function ID 104 provided by data collection module 312. Ontological features can include entity features and functional features. An entity feature identifies entities that are relevant to the state and the entity types thereof. For example, if a function ID corresponds to a software application that, amongst other functions, allows users to view photos of food, the entity features may include a name of the restaurant, a name of the dish, or a type of cuisine. The entity matching module 314 can utilize the portion of the knowledge base 352 organized according to the entity ontology 354 to identify the entity features and the portion of the knowledge base 352 organized according to the function ontology 356 to identify the functional features. The entity matching module 314 can also fetch other features pertaining to the function ID. The entity matching module can store the identified ontological features in the application state record 332.

The clustering module 316 identifies clusters 110 of states of software applications and generates/updates cluster records 362 based thereon. Identifying clusters 110 of states of software applications can refer to the clustering of application state records 332 and/or of function IDs 104 defined in the application state records 332 based on one or more features defined in the application state records 332. A developer (e.g., a developer of the search engine 400) can define a set of features on which to cluster the states (e.g., function IDs 104). For instance, a developer wishing to identify the most popular restaurants in an area can define the following set of features on which to cluster the states:

business type, number of accesses over a given period of time, and geographic location. In this example, the clustering module 316 can cluster the states based on these features to identify a plurality of clusters 110. One of the clusters 110 may include function IDs 104 corresponding to states of software applications that relate to restaurants that are popular and within a specific geographic region. Furthermore, states of software applications that do not relate to restaurants may be clustered together in a non-relevant cluster 110. In another example, a developer may want to identify states of applications that correspond to similar actions. In this example, the developer can define the following set of features: action type and entity types. In this example, function IDs 104 corresponding to similar actions and/or states that receive or define similar entity types may reside in the same clusters 110. A developer can select any set of features on which to cluster the states of the software applications. The clustering module 316 can be configured to perform any suitable clustering algorithm. Examples of clustering algorithms include, but are not limited to, k-means clustering, bi-clustering, tri-clustering, and k-nearest neighbors.

In operation the clustering module 316 receives a set of feature types. The clustering module 316 then clusters the function IDs 104 based on the feature types. The result of the clustering is one or more clusters 110. For each cluster 110 identified by the clustering module 316, the clustering module 316 generates a cluster record 362 corresponding to the cluster 110. The clustering module 316 may assign a cluster ID 364 to the cluster record 362. The cluster ID 364 may be any suitable value. In some implementations, the clustering module 316 increments a counter each time it identifies a new cluster 110 and uses the new counter value as the cluster ID 364.

The function ID data 366 defines the membership of the cluster 110. The clustering module 316 includes the function IDs 104 of the application state records 332 that were grouped in the identified cluster 110 in the function ID data 366 of the cluster record 362. In this way, the function ID data 366 identifies which application state records 332 belong to a particular cluster 110.

The clustering module 316 further includes the feature types that were used to identify the cluster 110 in the feature information 368 of the cluster record 362. In this way, the feature information 368 indicates the features that were used to identify the cluster 110.

Each time the clustering module 316 is called, the clustering module 316 can identify new clusters 110 of application state records 332 and/or update preexisting clusters 110. For example, when the clustering module 316 receives a set of feature types that it has not yet clustered, the clusters 110 resulting from the clustering on the new set of feature types are new clusters. In such a situation, the clustering module 316 identifies new clusters 110 and, therefore, generates new cluster records 362. In the event that the clustering module 316 is operating with a previously used set of feature types, the clustering module 316 may identify new members of preexisting clusters 110 (e.g., newly discovered states of software applications and/or states of software applications whose features have changed over time) or may identify clusters 110 with new members altogether. In the former scenario, the clustering module 316 may update clusters 110 that are previously identified clusters 110 with new members (e.g., newly discovered states of software applications and/or states of software applications whose features have changed over time). In the latter scenario, the clustering module 316 may identify one or more new clusters 110 all while updating one or more preexisting clusters 110.

The cluster records 362 identified by the analytics engine 300 can be used for many suitable applications. In some implementations, the cluster records 362 can be used to enhance relevance of search results 460 identified by the search engine 400.

Figure 5:
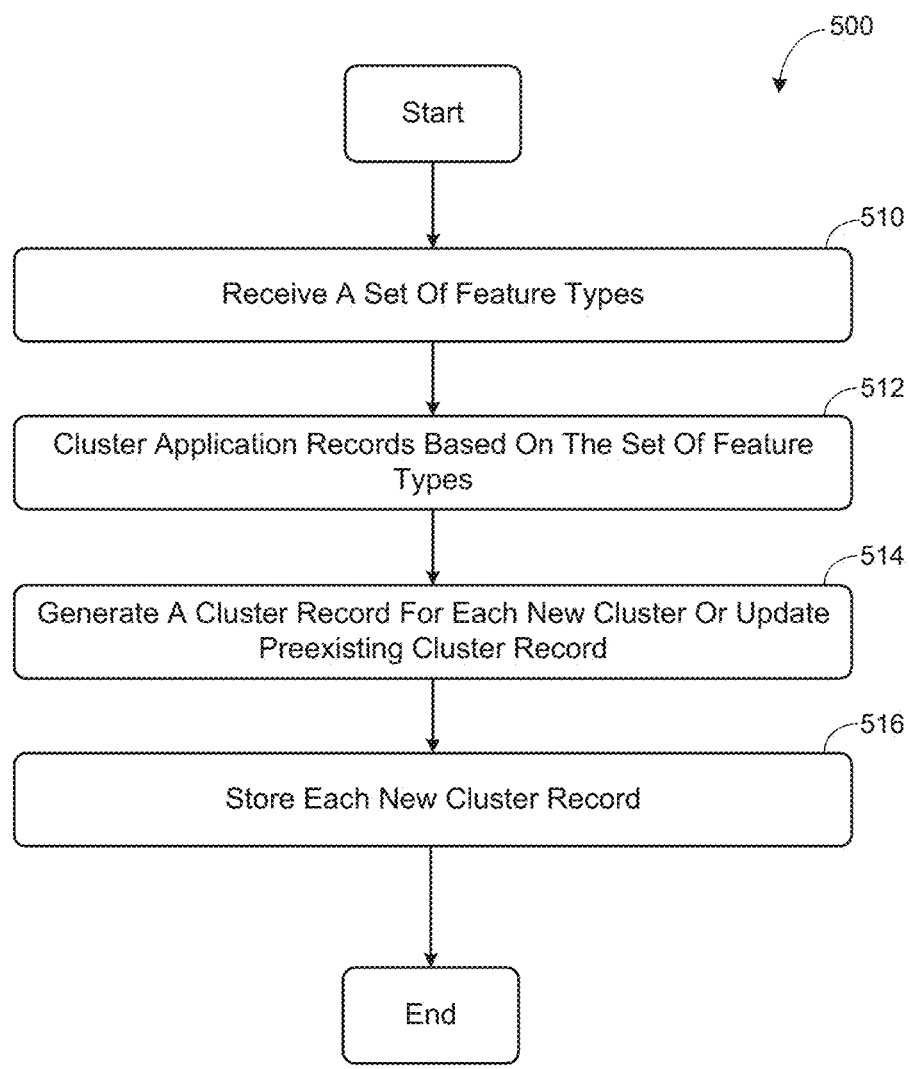
FIG. 5 is a flow chart illustrating an example set of operations of a method for generating a new cluster or updating a preexisting cluster.

FIG. 5 illustrates an example set of operations of a method 500 for generating a new cluster or updating a preexisting cluster. For purposes of explanation, the method 500 is explained with respect to the analytics engine 300 of FIG. 3A and is executed by the processing system 310 thereof. The method 500 may, however, be executed on any suitable computing device.

At operation 510, the clustering module 316 of the analytics engine 300 receives a set of feature types. The set of feature types may be provided to the clustering module 316 by a developer or learned by analytics engine 300 over time. Examples of sets of feature types may include: (popularity, category, geolocation); (popularity, geolocation); (popularity, geolocation, time of day); (category, geolocation); and (category, geolocation, time of day).

At operation 512, the clustering module 316 clusters function IDs 104 associated with application state records 332 based on the set of feature types. The clustering module 316 implements any suitable clustering algorithm, including but not limited to, bi-clustering, tri-clustering, or k-means clustering. The result of the clustering is one or more clusters 110 of function IDs 104. The resultant clusters 110 represent states of applications that are similar with respect to the set of feature types received at 510.

At operation 514, the clustering module 316 generates a cluster record 362 corresponding to each new cluster 110. For each new cluster record 362, the clustering module 316 assigns a cluster ID 364 to the new cluster record 362. In some scenarios, the set of feature types received by the clustering module 316 may already be associated with a preexisting cluster record 362. In these scenarios, the clustering module 316 may update the preexisting cluster record 362 associated with the preexisting cluster 110. The clustering module 316 updates the preexisting cluster record 362 to indicate any newly discovered states of software applications and/or states of software applications whose features have changed over time. At operation 516, the clustering module 316 stores each new cluster record 362 in the cluster data store 360.

The method 500 of FIG. 5 is provided for example only. The cluster records 362 stored in the cluster data store 360 have many different uses. For example, in some implementations the cluster records 262 are used to improve the relevance of search results.

Figure 4A:
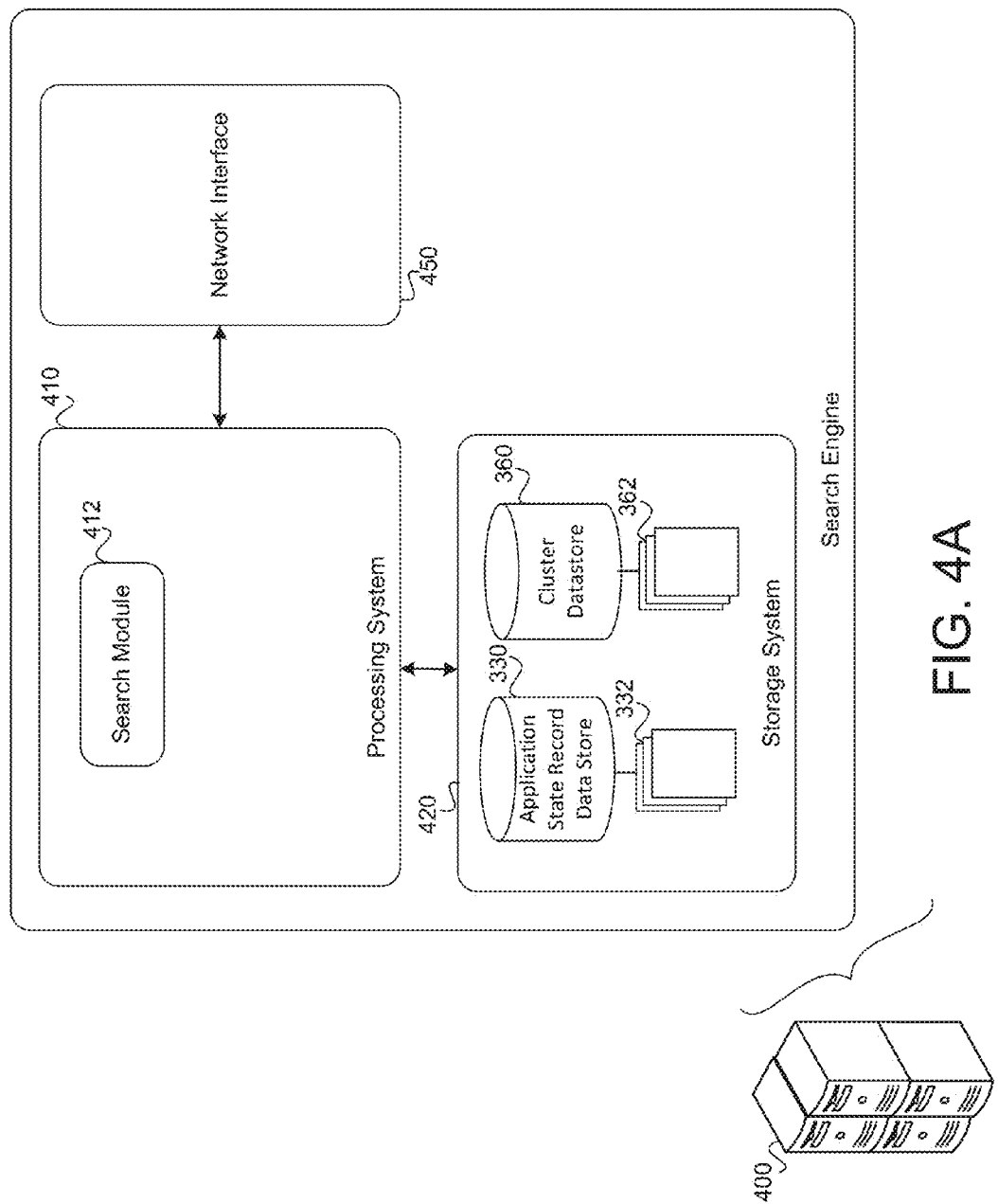
FIG. 4A is a schematic view of an example search engine.

FIG. 4A illustrates an example set of components of a search engine 400 according to some implementations of the present disclosure. In the illustrated example, a search engine 400 includes a processing system 410, a storage system 430, and a network interface 450. The processing system 410, a storage system 430, and a network interface 450 of the search engine 400 may be substantially similar to those of the analytics engine 300. In some instances, one or more of the components may be shared amongst the search engine 400, the analytics engine 300, and/or any other engines of the deep linking system 100. The processing system 410 executes a search module 412. The search module 412 accesses the application state record data store 330 and the cluster data store 360. In some implementations, the search module 412 further accesses the knowledge data store 350.

Figure 4B:
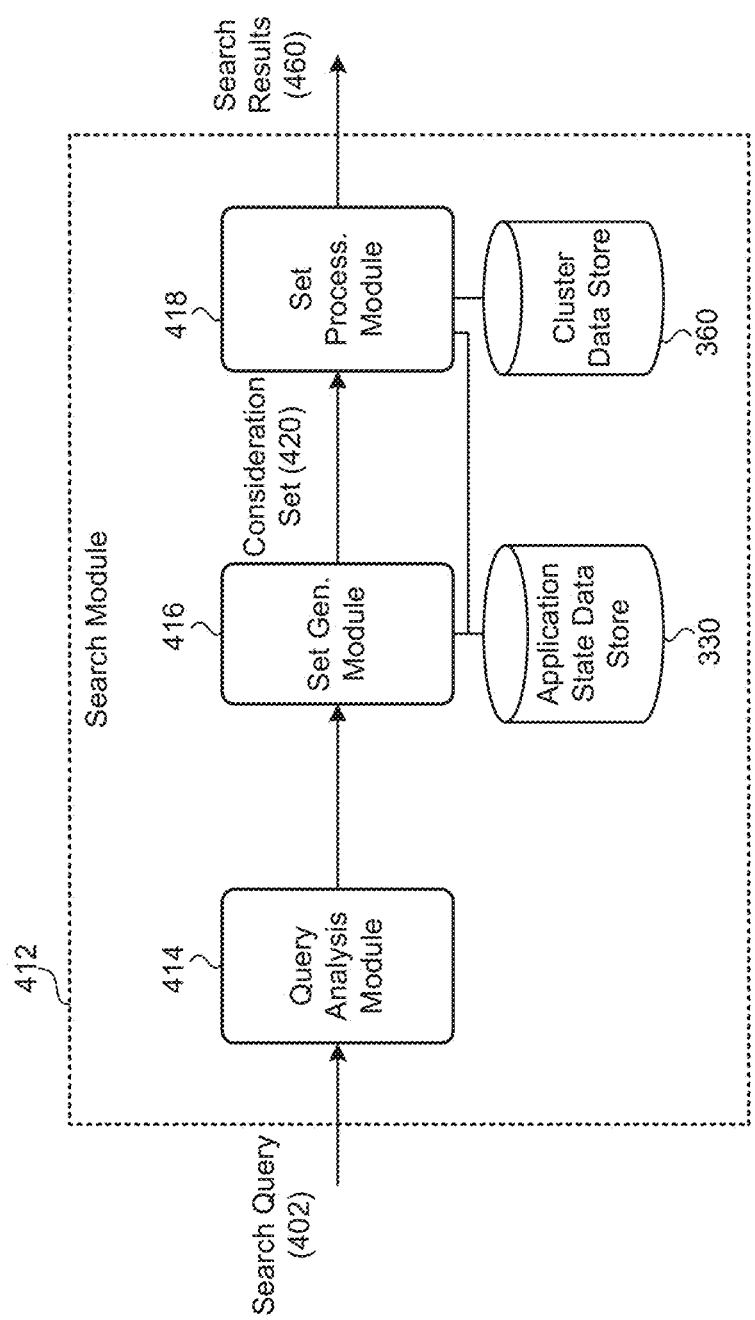
FIG. 4B is a schematic view of example components of a search module and a data flow thereof.

FIG. 4B illustrates example implementations of the search module 412. In the illustrated example, the search module 412 includes a query analysis module 414, a set generation module 416, and a set processing module 418. In operation, the query analysis module 414 receives a search query 402 and identifies one or more tokens representing the query 402. In some implementations, the query analysis module 414 also determines one or more entities that are referenced by the search query 402. The set generation module 416 searches the application state data store 330 using the tokens identified by the query analysis module 414 and identifies a consideration set 420 of records 332 based on the tokens and the contents of the applications state records 332. The consideration set 420 of records 332 may include actual application state records 332 or may include the function IDs 104 thereof. The set processing module 418 receives the consideration set 420 and generates search results 460 based thereon. The set processing module 418 scores each of the records 332 in the consideration set 420. The set processing module 418 may utilize the cluster records 362 to identify which clusters 110 the application state records 332 belong to when determining the score of each application state record 332.

The query analysis module 414 receives a search query 402 from a user device 200. In some implementations, the user device 200 further provides context parameters 404 with the search query 402. The context parameters 404 may identify additional information surrounding the search query 402. For instance, the context parameters 404 may indicate the geolocation of the user device 200 at the time of the search query 402, a set of native applications installed on the user device 200, and/or an operating system type of the user device 200. The search query 402 and the context parameters 404 may be communicated in a query wrapper or any suitable data structure. The query analysis module 414 analyzes the received search query 402 and/or context parameters 404. For example, the query analysis module 414 may perform various analysis operations on the received search query 402. Example analysis operations may include, but are not limited to, tokenization of the search query 402, filtering of the search query 402, stemming the search query 402, synonymization of the search query 402, and stop word removal from the search query 402. The query analysis module 414 can output tokens representing the search query 402.

The query analysis module 414 may further determine a set of entities implicated by the search query 402. In these implementations, the query analysis module 414 may reference the knowledge base 352 (e.g., an entity table or a portion structured according to the entity ontology 354) to identify the potential entities implicated by the search query 402 and/or the context parameters 404. In these implementations, the query analysis module 414 can further determine an entity score of the potential entities. The entity score indicates a likelihood that the potential entity is the entity implicated by the search query 402 and/or the context parameters 404. For example, if the search query 402 contains the query term "lax," the search query 402 may be referring to an airport ("Los Angeles International Airport") or a sport ("lacrosse"). In most cases, the entity score associated with the airport entity will be much greater than the entity score associated with the sport, as the term lax is much more likely to be used in connection with the airport. The query analysis module 414 may output the potential entity types and the corresponding entity scores with the tokens representing the query terms.

The set generation module 416 identifies a consideration set 420 of application state records 332 based on the received search query 402. As used herein, the term consideration set 420 can refer to a list of function IDs 104 of identified application state records 332 or the actual records 332 themselves. In some examples, the set generation module 416 may identify the application state records 332 based on matches between terms of the search query 402 (e.g., the tokens representing the search query 402) and terms in the application state records 332. According to some implementations, the set generation module 416 identifies the application state records 332 based on matches between tokens generated by the query analysis module 414 and words included in the records 332, such as words included in the application state information 334 thereof. In some of these implementations, the keywords defined in the application state records 332 are indexed in search indexes (e.g., inverted indexes) that relate keywords to the application state records 332 in which the keywords appear. In this way, the set generation module 416 may search the application state records 332 using one or more of these search indexes. The set generation module 416 may utilize the Apache Lucene software library by the Apache Software Foundation to search the application state records 332 and identify the consideration set 420. Additionally, the set generation module 416 can search the search indexes for records 332 that relate to entity types identified by the query analysis module 414. As the set generation module 416 identifies application state records 332 that match to the search query 402, the set generation module 416 can include the application state records 332 in the consideration set 420.

Furthermore, the set generation module 416 may determine an initial score of each application state record 332 included in the consideration set 420. The initial score of an application state record 332 may indicate a degree to which the search query 402 matches to the application state record 332 and/or a strength of the matching. The initial score of an application state record 332 may be based on the term-frequency inverse domain frequency (TF-IDF) scores of the query terms (or combination of query terms) that match to the application state record 332. The initial score of an application state record 332 may be based on other suitable factors as well.

The set processing module 418 scores the application state records 332 in the consideration set 420 in order to generate a set of search results 460. The scores associated with the application state records 332 may be referred to as result scores. The set processing module 418 may determine a result score for each of the application state records 332 identified the consideration set 420. The result scores associated with an application state record 332 may indicate the relative rank of the application state record 332 (e.g., the access mechanisms) among other application state records 332. Furthermore, the result score of an application state record 332 may indicate the relevance of the application state record 332 to the search query 402. For example, a larger result score may indicate that an application state record 332 is more relevant to the received search query 402 than an application state record 332 having a lower result score. The information conveyed by the search results 460 may depend on the result scores that are calculated by the set processing module 418. For example, the result scores may be indicative of the relevance of a state of a software application to the search query 402, the popularity of the state, and/or other properties of the state. The set processing module 418 utilizes properties of the application state record 332 and/or the search query 402 when determining the result score of the application state record 332.

The set processing module 418 may generate result scores for application state records 332 in a variety of different ways. In some implementations, the set processing module 418 generates a result score for an application state record 332 based on one or more scoring features. The scoring features may be associated with the application state record 332 and/or the search query 402. An application state record 332 scoring feature (hereinafter "record scoring feature") may be based on any data associated with an application state record 332. For example, record scoring features may be based on any data included in the application state information 334 of the application state record 332. Example record scoring features may be based on metrics associated with a person, place, thing, and/or function described in the application state record 332. Example metrics may include the popularity of a place described in the application state record 332 and/or ratings (e.g., user ratings) of the place described in the application state record 332. In one example, if the application state record 332 describes a song, a metric may be based on the popularity of the song described in the application state record 332 and/or ratings (e.g., user ratings) of the song described in the application state record 332. The record scoring features may also be based on measurements associated with the application state record 332, such as how often the application state record 332 is retrieved during a search and how often access mechanisms of the application state record 332 are selected by a user when appearing in the search results 460. Record scoring features may also be based on whether the application state record 332 includes an application access mechanism that leads to a default state or a deeper native application state.

The record scoring features of an application state record 332 may also include cluster information of the state of the software application described in the application state record 332. Put another way, the record scoring features of an application state record 332 may indicate one or more clusters 110 to which the application state record 332 belongs. The set processing module 418 references the cluster data store 360 to identify the cluster information. In some implementations, the set processing module 418 queries the cluster data store 360 with a function ID of an application state record 332 and a set of feature types. The cluster data store 360 returns a cluster ID 364 of a cluster record 362 which includes the function ID 104 in its respective function ID data 366 and the set of feature types in its respective feature information 368. In this way, the cluster data store 360 identifies clusters 110 that were clustered according to specified feature types and that contain the function ID 104 of the application state record 332 being scored. In some examples, the set processing module 418 may request clusters 110 that were clustered according to entity type and popularity. In other examples, the set processing module 418 may request clusters 110 that were clustered according to entity type, geographic area, and popularity. Additionally or alternatively, the set processing module 418 may request clusters 110 that were clustered according to action type and popularity or only according to popularity. Popularity can be measured as total accesses of a state of a software application or the rate of access of a state of a software application. In some implementations, the set processing module 418 uses the cluster ID 364 corresponding to a cluster 110 to represent the cluster 110 in the record scoring features. If an application state record 332 belongs to more than one cluster 110, the set processing module 418 can include the cluster IDs 364 of each cluster record 362 in the record scoring features.

A query scoring feature may include any data associated with the search query 402. For example, query scoring features may include, but are not limited to, a number of words in the search query 402, the popularity of the search query 402, and the expected frequency of the words in the search query 402. A record-query scoring feature may include any data generated based on data associated with both the application state record 332 and the search query 402 that resulted in identification of the application state record 332 by the set generation module 416. For example, record-query scoring features may include, but are not limited to, parameters that indicate how well the terms of the search query 402 match the terms of the application state information of the identified application state record 332 (e.g., the initial score assigned to the application state record 332 by the set generation module 416).

The set processing module 418 may generate a result score for a state record based on at least one of the record scoring features, the query scoring features, and the record-query scoring features. The set processing module 418 may determine a result score based on one or more of the scoring features listed herein and/or additional scoring features not explicitly listed. In some examples, the set processing module 418 may include one or more machine learned models (e.g., a supervised learning model) configured to receive one or more scoring features. The one or more machine learned models may generate result scores based on at least one of the record scoring features, the query scoring features, and the record-query scoring features. For example, the set processing module 418 may pair the search query 402 with each application state record 332 and calculate a vector of features for each (search query 402, record 332) pair. The vector of features may include one or more record scoring features, one or more query scoring features, and one or more record-query scoring features in the vector of features. The set processing module 418 may then input the vector of features into a machine-learned regression model to calculate a result score for the application state record 332. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores associated with the application state records 332 (e.g., access mechanisms) may be used in a variety of different ways. The set processing module 418 may rank and/or filter the application state records 332 identified in the consideration set based on the result scores associated with the application state records 332. In these examples, a larger result score may indicate that the application state record 332 (e.g., the function or application state described in the application state record 332) is more relevant than application state records 332 having a lesser result score. In examples where the user device 200 displays the displayed search results 460 as a list, the user device 200 may display the user selectable links (e.g., cards 408) corresponding to application state records 332 having larger result scores nearer to the top of the results list (e.g., near to the top of the screen) than the user selectable links corresponding to the application state records 332 having lower result scores. In some implementations, the set processing module 418 can remove any records from the consideration set that do not have a sufficient result score (e.g., the result score of the records is too low, or the number of application state records 332 having a greater result score exceeds a threshold).

After the application state records 332 in the consideration set of records have been scored, ranked, and/or filtered, the set processing module 418 can generate the search results 460 based on at least a subset of the application state records 332. For each of the remaining application state records 332, the set processing module 418 generates a result object based on the application state record 332. The set processing module 418 can utilize a result object template to generate the result object. In these implementations, the set processing module 418 populates the fields of the result object template with information contained in the application state information 334 of the application state record 332. In this way, the set processing module 418 generates a result object that may be rendered by the user device 200 when delivered in the search results 460. The set processing module 418 may generate the result objects in any other suitable manner. The set processing module 418 can include the generated result objects in a container, such as a hyper-text markup language (HTML) document that can be embedded in another HTML document (e.g., via an iFrame) or a JavaScript Object Notation (JSON) object. The container may be said to contain the search results 460. The set processing module 418 (or a downstream module) may transmit the search results 460 to the user device 200 that transmitted the results.

By including the clusters 110 of the application state records 332 in the set of features that are used to calculate the result score, the relevance of the search results 460 can be improved. For example, the machine-learned scoring model may learn that users prefer to select search results 460 that relate to more popular states of software applications. Similarly, with some types of search queries, users may want to find search results that link to states of software applications that perform the same type of function. In such a scenario, all of these states may be included in the same cluster 110 when clustered according to function type and popularity. In another example, the machine-learned scoring model may learn that users prefer accessing states of applications that perform certain functions at particular times of the day. For instance, if a user enters a name of a restaurant, the machine-learned scoring model may have learned that viewing pictures of dishes from the restaurant or making reservations for the restaurant are more relevant in mornings, while driving directions to the restaurant are more popular in the evenings. In this example, the clusters 110 may be clustered according to popularity and time of the day. The relevance of the search results 460 can also be improved by considering the current user-context, and adjusting the scores of the results based on the relative popularity of clusters 110 of similar context. For example, a user in Miami searches for dessert at the same time a user in New York City searches for dessert. There might be a cluster 110 of states of applications corresponding to Ice Cream shops accessed by users in or near Miami, Fla. There may also be another cluster of states of applications corresponding to pastry shops accessed by users in or near New York, N.Y. In response to a search queries containing the term "dessert," the consideration set may identify application state records corresponding to ice cream shops and pastry shops. The set processing module 418 may determine higher score for states corresponding to ice cream shops than for states corresponding to pastry shops when the context parameters 404 indicate that the search query 402 is received from Miami. Similarly, the set processing module 418 may determine higher scores for states corresponding to pastry shops than states corresponding to ice cream shops when the context parameters 404 indicate that the search query 402 is received from New York.

In some implementations, users may opt to provide their user-history to improve the relevance of search results. In these implementations, the relevance of the search results 460 can be further improved by matching user-history to clusters 110. When a user performs a first search, and then a second search, the search query 402 and any items clicked from the first search can connect the user with one or more clusters 110. Future searches can have the results from clusters 110 to which the user is most strongly related given higher scores. For example, Monday at 8 PM a user does a search for "Chinese food" and the user selects a search result corresponding to a state of an application that provides reviews of an "expensive" Chinese food restaurant (e.g., has a price rating of five dollar signs). On Tuesday at 8 PM the user does a search for "Mexican food." In one scenario, the state of the application indicated by the selected search result from the Monday search may be found in a first cluster 110 corresponding to Chinese restaurants (e.g., "Chines restaurant cluster") and a second cluster 110 corresponding to expensive restaurants (e.g., "expensive restaurant cluster"). In this scenario, the set processing module 418 can score application states corresponding to expensive Mexican restaurants higher than application states corresponding to other Mexican restaurants, provided that the states corresponding to expensive restaurants are indicated in the second cluster 110 (e.g. in the "expensive restaurant cluster").

Figure 6:
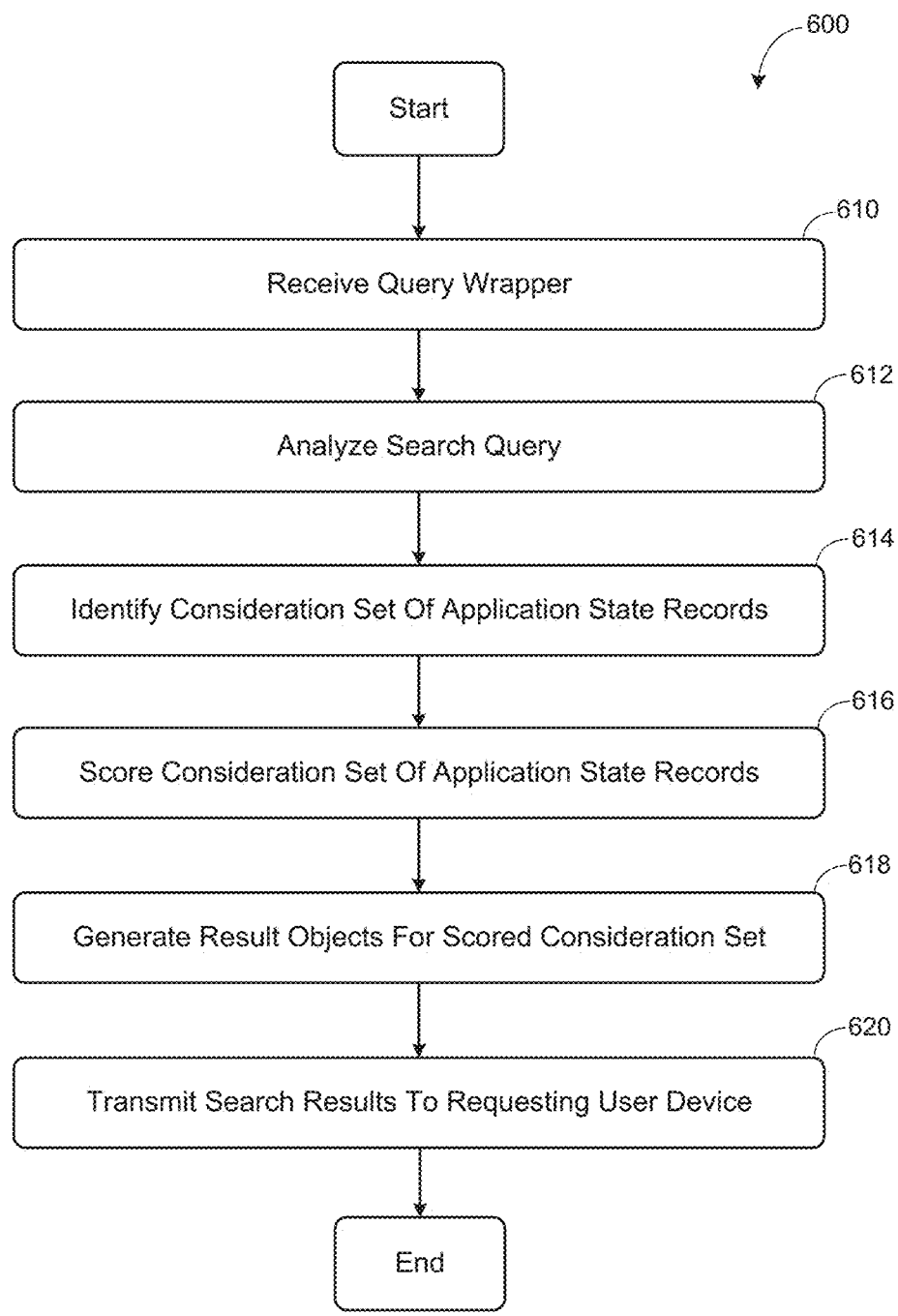
FIG. 6 is a flow chart illustrating an example set of operations of a method for processing a search query.

FIG. 6 illustrates an example set of operations of a method 600 for processing a search query 402. For purposes of explanation, the method 600 is explained with respect to the search engine 400 of FIG. 4A and is executed by the processing system 410 thereof. The method 600 may, however, be executed on any suitable computing device.

At operation 610, the query analysis module 414 receives a query wrapper (not shown) that includes the search query 402 and one or more context parameters 404 (FIG. 1A). At operation 612, the query analysis module 414 analyzes the search query 402, and in some implementations, the additional context parameters 404. The query analysis module 414 parses and analyzes the search query 402 and outputs one or more tokens. The query analysis module 414 can stem the search query 402, synonymize the search query 402, remove stop words from the search query 402, and/or tokenize the search query 402. The query analysis module 414 may further reference the knowledge base 352 to identify potential entities implicated by the search query 402 and/or context parameters 404. The query analysis module 414 may also determine an entity score of the potential entities. The query analysis module 414 outputs the potential entity types and the corresponding entity scores with the tokens representing the query terms to the set generation module 416.

At operation 614, the set generation module 416 identifies a consideration set of application state records 332 based on the one or more tokens, entity types, and associated entity scores. The set generation module 416 can search the application state record data store 330 using the tokens. As previously discussed, in some implementations the set generation module 416 utilizes the Apache Lucene library to search and identify a consideration set of application state records 332. Additionally, the set generation module 416 can search the application state record data store 330 for records 332 that relate to entity types identified by the query analysis module 414. As the set generation module 416 identifies application state records 332 that match to the search query 402, the set generation module 416 can include the application state records 332 in the consideration set 420. The set generation module 416 outputs the consideration set 420 to the set processing module 418.

At operation 616, the set processing module 418 generates result scores for each application state record 332 in the consideration set 420 based on one or more scoring features (e.g., record scoring features, query scoring features, and/or record-query scoring features). The record scoring features can incorporate, among other information, cluster records associated with the state of the software application described in the application state record 332. In this way, the set processing module 418 can improve the relevance of the search results 460 by leveraging information that is stored in the cluster data store 360. For example, the set processing module 418 may utilize a cluster 110 clustered according to popularity and time of day (i.e., the time the search query 402 is transmitted from a user device 200). The set processing module 418 can provide higher result scores to application state records 332 associated with states appearing in the cluster 110 because states appearing in the cluster 110 are popular during the time of day that the search was conducted by the user. Continuing with this example, the set processing module 418 can provide lower result scores for application state records 332 associated with states that are unpopular among users during the time of day that the search was conducted by the user. In another example, the set processing module 418 may utilize a cluster 110 clustered according to type of restaurant and geographical location. In this example, the set processing module 418 may provide lower result scores for states that, despite being of the correct restaurant type, do not appear in the cluster 110 because they are associated with a different geographical location. The set processing module 418 can further utilize one or more machine-learned models (e.g., a supervised learning model) configured to receive one or more scoring features and generate a result score. After generating a result score for each application state record 332 in the consideration set 420, the set processing module 418 may rank and/or filter the application state records 332 based on the result scores associated with the application state records 332.

At operation 618, the set processing module 418 generates the search results 460 based on at least a subset of the application state records 332 in the scored consideration set 420. For each of the remaining application state records 332 in the subset of application state records 332, the set processing module 418 generates a result object based the application state record 332. At operation 620, the set processing module 418 includes the result objects in a container, such as a HTML document or JSON object, and transmits the container as search results 460 to the requesting user device.

The method 600 of FIG. 6 is provided for example only and not intended to limit the scope of the disclosure. A search engine 400 may perform a search that utilizes the cluster records 362 in other suitable manners as well without departing from the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An electronic device comprising:
 a storage that stores:
  a plurality of application state records, each application state record including i) a function identifier that indicates a state of a respective software application, and ii) application state information indicating content corresponding to data provided by a software application when the software application is set in an application state indicated by the application state record; and
  a plurality of cluster records, each cluster record indicating a respective cluster of a plurality of clusters, each cluster including a respective clustered function identifier among a plurality of clustered function identifiers, each clustered function identifier indicating the state of the respective software application, the plurality of clusters being clustered according to one or more features; and one or more processors configured to execute computer-readable instructions, the computer-readable instructions, when executed by the one or more processors, causing the one or more processors to:
receive a search query containing one or more query terms from a remote device,
identify a consideration set of application state records from the plurality of application state records based on the search query, each application state record matching to at least one of the one or more query terms, and
for each application state record in the consideration set:
identify, based on the search query, one or more cluster records from the plurality of cluster records using the function identifier of the application state record,
determine a result score of the application state record included in the consideration set of application state records based on contents of the application state record and one or more cluster records,
generate search results based on the application state records in the consideration set and the result scores thereof, and
transmit the search results to the remote device.

2. The electronic device of claim 1, wherein the plurality of clusters of application state records are determined based on usage data collected from a plurality of user devices, the usage data indicating states of software applications accessed by users of the user devices.

3. The electronic device of claim 2, wherein at least a subset of the plurality of clusters of application state records are clustered according to a popularity feature, a geography feature, and one or more entity features.

4. The electronic device of claim 2, wherein at least a subset of the plurality of clusters of application state records are clustered according to a popularity feature and a function feature.

5. The electronic device of claim 2, wherein each cluster record indicates a set of feature types on which the cluster of application state records represented by the cluster record was clustered.

6. The electronic device of claim 2, wherein the usage data received from each of the user devices includes a search activity log, the search activity log indicating actions performed by a user in response to being presented with previously transmitted search results.

7. The electronic device of claim 1, wherein the identifying of the one or more clusters of application state records for each application state record in the consideration set comprises:
determining the function identifier of the application state record; and
searching a subset of the plurality of cluster records using the function identifier of the application state record to identify the cluster records in the subset of the plurality of cluster records, the subset of the plurality of cluster records being selected based on having been clustered according to one or more sets of feature types.

8. The electronic device of claim 7, wherein the determining of the result score for each application state record in the consideration set comprises:
including the cluster identifiers of the identified cluster records in a feature vector corresponding to the application state record, the feature vector defining a plurality of features of the application state record; and
feeding the feature vector into a machine-learned scoring module, the machine-learned scoring model determining the result score of the application state record based on the feature vector.

9. A method comprising:
maintaining, by one or more processors, a plurality of application state records on a storage, each application state record including i) a function identifier that indicates content corresponding to data provided by a software application when the software application is set in an application state indicated by the application state record;
maintaining, by the one or more processors, a plurality of cluster records on a storage device, each cluster record indicating a respective cluster, each cluster including a respective clustered function identifier among a plurality of clustered function identifiers, each clustered function identifier indicating the state of the respective software application, the plurality of clusters of application state records being clustered according to one or more features;
receiving, by the one or more processors, a search query containing one or more query terms from a remote device;
identifying, by one or more processors, a consideration set of application state records from the plurality of application state records based on the search query, each application state record matching to at least one of the one or more query terms; and
for each application state record in the consideration set:
identifying, by the one or more processors, based on the search query, one or more cluster records from the plurality of cluster records using the function identifier of the application state record included in the consideration set of application state records;
determining, by the one or more processors, a result score of the application state record included in the consideration set of application state records based on the contents of the application state record and one or more cluster records;
generating, by the one or more processors, search results based on the application state records of the consideration set and result scores thereof; and
transmitting, by the one or more processors, search results to the remote device.

10. The method of claim 9, wherein the plurality of clusters of application state records are determined based on usage data collected from a plurality of user devices, the usage data indicating states of software applications accessed by users of the user devices.

11. The method of claim 10, wherein at least a subset of the plurality of clusters of application state records are clustered according to a popularity feature, a geography feature, and one or more entity features.

12. The method of claim 10, wherein at least a subset of the plurality of clusters of application state records are clustered according to a popularity feature and a function feature.

13. The method of claim 10, wherein each cluster record indicates a set of feature types on which the cluster of application state records represented by the cluster record was clustered.

14. The method of claim 10, wherein the usage data received from each of the user devices includes a search activity log, the search activity log indicating actions performed by a user in response to being presented with previously transmitted search results.

15. The method of claim 9, wherein determining the one or more clusters of application state records for each application state record in the consideration set comprises:
   determining the function identifier of the application state record; and
   searching a subset of the plurality of cluster records using the function identifier of the application state record to identify the cluster records in the subset of the plurality of cluster records, the subset of the plurality of cluster records being selected based on having been clustered according to one or more sets of feature types.

16. The method of claim 15, wherein determining the result score for each application state record in the consideration set comprises:
   including the cluster identifier of the identified cluster records in a feature vector corresponding to the application state record, the feature vector defining a plurality of features of the application state record; and
   feeding the feature vector into a machine-learned scoring module, the machine-learned scoring model determining the result score of the application state record based on the feature vector.

* * * * *